US011359107B2

(12) United States Patent
Okamoto et al.

(10) Patent No.: US 11,359,107 B2
(45) Date of Patent: Jun. 14, 2022

(54) INK SET AND METHOD FOR PRODUCING PRINTED MATTER

(71) Applicants: TOYO INK SC HOLDINGS CO., LTD., Tokyo (JP); TOYOCOLOR CO. LTD., Tokyo (JP)

(72) Inventors: Mayuko Okamoto, Tokyo (JP); Atsushi Yoda, Tokyo (JP); Norio Suzuki, Tokyo (JP); Kazuhiro Jonai, Tokyo (JP)

(73) Assignees: TOYO INK SC HOLDINGS CO., LTD., Tokyo (JP); TOYOCOLOR CO., LTD, Tokyo (JP)

( * ) Notice: Subject to any disclaimer, the term of this patent is extended or adjusted under 35 U.S.C. 154(b) by 99 days.

(21) Appl. No.: 16/630,578

(22) PCT Filed: Jul. 13, 2018

(86) PCT No.: PCT/JP2018/026566
§ 371 (c)(1),
(2) Date: Jan. 13, 2020

(87) PCT Pub. No.: WO2019/013338
PCT Pub. Date: Jan. 17, 2019

(65) Prior Publication Data
US 2020/0172754 A1    Jun. 4, 2020

(30) Foreign Application Priority Data

Jul. 14, 2017  (JP) .............................. JP2017-137568

(51) Int. Cl.
| C09D 11/54 | (2014.01) |
| B41M 5/00 | (2006.01) |
| B41M 5/50 | (2006.01) |
| B41M 7/00 | (2006.01) |
| C09D 11/033 | (2014.01) |
| C09D 11/107 | (2014.01) |
| C09D 11/322 | (2014.01) |
| C09D 11/38 | (2014.01) |
| C09D 11/40 | (2014.01) |

(52) U.S. Cl.
CPC ........... *C09D 11/54* (2013.01); *B41M 5/0023* (2013.01); *B41M 5/502* (2013.01); *B41M 7/0018* (2013.01); *C09D 11/033* (2013.01); *C09D 11/107* (2013.01); *C09D 11/322* (2013.01); *C09D 11/38* (2013.01); *C09D 11/40* (2013.01)

(58) Field of Classification Search
CPC .......... B41J 2/01; B41M 5/00; B41M 5/0023; B41M 5/502; B41M 7/0018; C09D 11/033; C09D 11/107; C09D 11/322; C09D 11/38; C09D 11/40; C09D 11/54
See application file for complete search history.

(56) References Cited

U.S. PATENT DOCUMENTS

| 2009/0258203 | A1 | 10/2009 | Aoyama et al. | |
| 2010/0149231 | A1 | 6/2010 | Mori et al. | |
| 2011/0063362 | A1 | 3/2011 | Takaori et al. | |
| 2013/0135382 | A1* | 5/2013 | Mitsuzawa | .......... C09D 11/322 347/20 |
| 2015/0274992 | A1* | 10/2015 | Aoyama | ................ C09D 11/54 347/21 |
| 2016/0060810 | A1 | 3/2016 | Saito et al. | |
| 2019/0016911 | A1* | 1/2019 | Okamoto | ................. B41M 5/00 |

FOREIGN PATENT DOCUMENTS

| EP | 3 403 840 A1 | 11/2018 |
| EP | 3 543 298 A1 | 9/2019 |
| JP | 2000-238422 A | 9/2000 |
| JP | 2000-335084 A | 12/2000 |
| JP | 2009-241304 A | 10/2009 |
| JP | 2009-262549 A | 11/2009 |
| JP | 2010-142965 A | 7/2010 |
| JP | 2010-247381 A | 11/2010 |
| JP | 2011-056884 A | 3/2011 |
| JP | 2012-131108 A | 7/2012 |
| JP | 2013-112701 A | 6/2013 |
| JP | 2013-188958 A | 9/2013 |
| JP | 2013-194122 A | 9/2013 |
| JP | 2013-194222 A | 9/2013 |
| JP | 2013-199603 A | 10/2013 |
| JP | 2013-199719 A | 10/2013 |
| JP | 2015-160860 A | 9/2015 |

(Continued)

OTHER PUBLICATIONS

Machine Translation of JP 2013-194122A (Year: 2013).*
Communication dated Jul. 1, 2020, from the European Patent Office in European Application No. 18832273.9.
Official Action dated Feb. 13, 2018, for corresponding JP patent application No. 2017-137568.
Official Action dated Jun. 12, 2018, for corresponding JP patent application No. 2017-137568.
International Search Report of PCT/JP2018/026566 dated Oct. 16, 2018 [PCT/ISA/210].

*Primary Examiner* — Sathavaram I Reddy
(74) *Attorney, Agent, or Firm* — Sughrue Mion, PLLC

(57) ABSTRACT

An ink set containing an inkjet ink and a treatment liquid used in combination with the inkjet ink, wherein the inkjet ink contains a pigment, a water-soluble organic solvent, a surfactant and water, the water-soluble organic solvent contains a glycol ether-based organic solvent having a specific structure, the treatment liquid contains a coagulant, the coagulant contains calcium nitrate in an amount of 6.8 to 20.8% by mass relative to the total mass of the treatment liquid, and the amount of compounds contained in the treatment liquid that have three or more hydroxyl groups is not more than 15% by mass relative to the total mass of the treatment liquid.

11 Claims, No Drawings

(56) References Cited

FOREIGN PATENT DOCUMENTS

| | | |
|---|---|---|
| JP | 2015-161043 A | 9/2015 |
| JP | 2016-050277 A | 4/2016 |
| JP | 2017-025322 A | 2/2017 |
| WO | WO-2017122818 A1 * | 7/2017 ............. B41M 5/00 |

* cited by examiner

INK SET AND METHOD FOR PRODUCING PRINTED MATTER

CROSS REFERENCE TO RELATED APPLICATIONS

This application is a National Stage of International Application No. PCT/JP2018/026566, filed Jul. 13, 2018, claiming priority to Japanese Patent Application No. 2017-137568, filed Jul. 14, 2017, the contents of all of which are incorporated herein by reference in their entirety.

TECHNICAL FIELD

The present invention relates to an ink set and a method for producing printed matter using the ink set.

BACKGROUND ART

Inkjet printing is a recording method in which liquid droplets of an inkjet ink that have been jetted from an inkjet head are jetted directly onto a recording medium to form text or images. Unlike conventional plate-based printing techniques such as offset printing and gravure printing, inkjet printing has characteristics that include not requiring plate-making and being compatible with variable printing, simple operation and adjustment of the printing apparatus, and little noise during printing. Inkjet printing is widely used in offices and households, and has recently also been showing increased demand in industrial applications.

The inkjet inks used in inkjet printing are classified into solvent inks, aqueous inks and UV-curable inks and the like depending on the ink composition. In recent years, there has been a growing movement to restrict the use of organic solvents and photosensitive monomers that can be harmful to people and the environment, and as a result, there is a growing demand for the replacement of solvent inks and UV-curable inks that use these types of restricted materials with aqueous inks.

The liquid component in an aqueous inkjet ink contains water as the main component, and in order to control the wetting of the recording medium and the drying properties, typically also contains an added water-soluble organic solvent such as glycerol or a glycol. When an inkjet ink containing these liquid components is used for printing (applying the ink to form) a pattern of text and/or images onto a recording medium, the ink dries as a result of the liquid components penetrating into the recording medium and/or evaporating from the recording medium, thereby fixing the ink components to the recording medium.

On the other hand, recording media used in inkjet printing, broadly classified in terms of material, include paper substrates, fabric substrates, and plastic substrates and the like. Among these, the amount of paper substrates produced is large, and in the case of paper substrates, high-speed printing is required and high-image quality is also necessary. A large variety of paper substrates exist, from papers having high permeability such as high-quality papers and recycled papers, through to papers having low permeability (or no permeability) such as coated papers and art papers. In order to further expand the demand for inkjet printing, the development of aqueous inkjet inks that can be used on recording media composed of all manner of materials is a large task for those skilled in the art.

However, conventional aqueous inkjet inks have low viscosity, and also have a high surface tension due to the water. As a result, particularly in those cases where the above type of ink is used to print to a paper substrate having high permeability, the ink penetrates into the interior of the paper substrate, meaning problems such as feathering (a bleeding phenomenon that occurs along the substrate fibers) tend to occur readily. Further, when the above type of ink is used to print to a paper substrate having low permeability, the liquid droplets of the ink mix together, causing problems such as coalescence and color mixing. Accordingly, achieving high-image quality printed matter regardless of the recording medium has proven difficult with printing using conventional aqueous inkjet inks.

One known countermeasure for the above problem is a method in which the recording medium is treated with a treatment liquid. Generally known treatment liquids for inkjet inks are of two types: treatment liquids that form a layer (an ink-receiving layer) that absorbs liquid components in the inkjet ink and improves the drying properties (see Patent Documents 1 to 4), and treatment liquids that form a layer (an ink aggregation layer) that initially causes aggregation of solid components contained in the ink such as the colorant and resins, thereby preventing bleeding between liquid droplets and improving the image quality (see Patent Documents 5 and 6).

However, in methods that employ an ink-receiving layer, because the thickness of the layer must be considerably large, the texture of the recording medium may sometimes deteriorate. Further, deterioration in the density and color gamut due to absorption of the ink by the ink-receiving layer, and bleeding or color mixing due to variations in the amount of absorption may sometimes occur.

On the other hand, in methods that employ an ink aggregation layer, although the ability of the recording medium to receive the liquid components is inferior, the ink can be fixed on the surface of the ink aggregation layer without any significant impairment of the texture of the recording medium, and therefore printing at high density with a broad range of color rendering is possible. Furthermore, provided the ink aggregation layer can be applied uniformly, dot fusion of the inkjet ink can be suppressed, and the ink dots can be formed with an ideal circular form.

Patent Documents 5 and 6 disclose treatment liquids capable of forming ink aggregation layers, but further improvements are still required in terms of print quality and the like. Specifically, Patent Document 5 discloses a treatment liquid (reaction liquid) containing a copolymer formed from a hydrophilic monomer and a hydrophobic monomer. Further, in the examples, sets composed of a treatment liquid containing 6% by mass of magnesium nitrate and an inkjet ink containing glycerol and diethylene glycol as water-soluble organic solvents are evaluated. However, when high-speed printing is performed, treatment liquids containing magnesium nitrate as a coagulant are unable to generate a satisfactory aggregation (color mixing suppression) effect.

In contrast, another possible method involves increasing the coating amount of the treatment liquid in order to achieve a satisfactory aggregation effect. However, because the amounts of water and organic solvent applied also increase, drying of the treatment tends to be unsatisfactory. This increases the possibilities of a deterioration in the drying properties and coating film durability of the subsequently printed inkjet ink, or a deterioration in the printed image quality caused by coalescence of the liquid droplets of the inkjet ink. Further, another possible method involves increasing the amount of coagulant in the treatment liquid in order to achieve a better aggregation effect. However, this can cause excessive suppression of wet spreading of the inkjet ink, increasing the likelihood of inadequate coverage of solid printed portions, and leading to a deterioration in the print quality.

Further, Patent Document 6 discloses a recording method that uses an ink set composed of a treatment liquid containing a polyvalent metal salt and a polyether-modified polysiloxane-based compound, and an inkjet ink containing resin microparticles. Patent Document 6 discloses that by using this ink set, printed matter having excellent coating film durability and printed image quality can be obtained, but this ink set is used on a recording medium having a specific absorption layer. Accordingly, for example, if this ink set is used to perform printing to a paper substrate having high permeability, there is a possibility that image defects such a color mixing may occur. Further, the polyvalent metal salts used in the examples of Patent Document 6 are magnesium nitrate, magnesium sulfate and calcium acetate, and in a similar manner to Patent Document 5, when high-speed printing is performed, there is a possibility that a satisfactory aggregation (color mixing suppression) effect may not be achievable.

As outlined above, with conventional ink sets containing a treatment liquid and an inkjet ink, obtaining superior coating film durability and drying properties regardless of the recording medium and the printing conditions such as the printing speed has been problematic, and producing printed matter of high image quality with no image defects such as color mixing or insufficient coverage has proven difficult, meaning further improvements are required.

PRIOR ART DOCUMENTS

Patent Documents

Patent Document 1: JP 2000-238422 A
Patent Document 2: JP 2000-335084 A
Patent Document 3: JP 2012-131108 A
Patent Document 4: JP 2009-241304 A
Patent Document 5: JP 2013-188958 A
Patent Document 6: JP 2009-262549 A

SUMMARY OF INVENTION

Problems Invention Aims to Solve

The present invention has been developed in light of the above circumstances, and provides an ink set containing a treatment liquid and an inkjet ink which, regardless of the recording medium and the printing conditions such as the printing speed and the recording resolution, exhibits excellent coating film durability and drying properties, and is capable of suppressing image defects such as color mixing and insufficient coverage to produce printed matter of high image quality. Further, the present invention provides the above ink set which, in addition to the above, exhibits excellent storage stability and can maintain the aforementioned quality even after a long period of time has elapsed. Moreover, the present invention also provides a method for producing printed matter of high image quality using the above ink set.

Means for Solution of the Problems

As a result of intensive research aimed at resolving the issues described above, the inventors of the present invention discovered that an ink set composed of an inkjet ink containing an organic solvent of a specific structure and a surfactant, and a treatment liquid containing a specific amount of calcium nitrate as a coagulant but containing not more than a specific amount of a compound having a specific structure was able to address the above issues, thus enabling them to complete the present invention.

In other words, the present invention relates to the following embodiments. However, the present invention is not limited to the following embodiments, and includes a variety of embodiments.

One embodiment relates to an ink set containing an inkjet ink and a treatment liquid used in combination with the inkjet ink. In this ink set, the inkjet ink contains a pigment, a water-soluble organic solvent, a surfactant and water, and the water-soluble organic solvent contains a glycol ether-based organic solvent (A) represented by general formula (1) shown below. Further, the treatment liquid contains a coagulant, the coagulant contains calcium nitrate in a proportion of 6.8 to 20.8% by mass relative to the total mass of the treatment liquid, and in the treatment liquid, the amount of compounds having three or more hydroxyl groups is not more than 15% by mass relative to the total mass of the treatment liquid.

General formula (1): $\text{R1-(-O—CH}_2\text{CH}_2\text{-)}_n\text{-OH}$

In general formula (1), R1 represents an alkyl group of 2 to 4 carbon atoms which may have a branched structure. Further, n represents 2 or 3.

In one embodiment, the pH of the treatment liquid is preferably within a range from 3.5 to 11.

In one embodiment, the treatment liquid preferably also contains a pH adjuster.

In one embodiment, the treatment liquid preferably also contains a nonionic surfactant. The nonionic surfactant preferably includes at least one compound selected from the group consisting of an acetylene-based surfactant and a siloxane-based surfactant.

In one embodiment, the inkjet ink preferably also contains a pigment dispersing resin.

In one embodiment, the glycol ether-based organic solvent (A) represented by general formula (1) preferably includes a glycol ether-based organic solvent in which n represents 2.

In one embodiment, the water-soluble organic solvent preferably also contains a diol-based solvent (B) having a surface tension at 25° C. of 30 to 50 mN/m.

In one embodiment, the mass ratio ((A):(B)) of the blend amount of the glycol ether-based organic solvent (A) represented by general formula (1) to the blend amount of the diol-based solvent (B) having a surface tension at 25° C. of 30 to 50 mN/m is preferably within a range from 1:0.5 to 1:7.5.

Another embodiment relates to a method for producing inkjet ink printed matter that uses the ink set of one of the embodiments described above, wherein the method includes: a step of applying the treatment liquid to a recording medium formed from a paper substrate or a synthetic paper substrate, and a step of applying the inkjet ink by one-pass printing to a portion to which the treatment liquid has been applied.

In one embodiment, the step of applying the treatment liquid to the recording medium is preferably conducted so that the amount of calcium ions on the surface of the recording medium is within a range from 0.5 to 5 mmol/m².

Another embodiment relates to a printed matter obtained by printing the ink set according to an embodiment described above onto a recording medium.

Effects of the Invention

The present invention is able to provide an ink set composed of a treatment liquid and an inkjet ink which, regardless of the recording medium and the printing conditions such as the printing speed and the recording resolution, exhibits excellent coating film durability and drying properties, and is capable of producing printed matter of high image quality with good suppression of image defects such as color mixing and insufficient coverage. Further, the present invention can also provide the above ink set which, in addition to the above, exhibits excellent storage stability and can maintain the above quality even after a long period of time has elapsed. Moreover, the present invention can also provide a method for producing printed matter of high image quality using the above ink set.

EMBODIMENTS FOR CARRYING OUT THE INVENTION

Preferred embodiments of the present invention are described below in further detail. However, the embodiments described below merely describe examples of the present invention. The present invention is in no way limited by the following embodiments, and also includes all manner of modifications that can be made within the scope of the invention.

1. Ink Set

One embodiment relates to an ink set, wherein the ink set contains an inkjet ink (hereafter sometimes referred to as simply "the ink") containing a pigment, a water-soluble organic solvent, a surfactant and water, and a treatment liquid containing a coagulant. In one embodiment, the ink set satisfies the following conditions (i) to (iii).

(i) The water-soluble organic solvent contains a glycol ether-based organic solvent (A) represented by general formula (1) shown above.

(ii) The coagulant contains calcium nitrate, and the amount of the calcium nitrate is within a range from 6.8 to 20.8% by mass relative to the total mass of the treatment liquid.

(iii) In the treatment liquid, the amount of compounds having three or more hydroxyl groups is not more than 15% by mass relative to the total mass of the treatment liquid, and this amount may be 0% by mass.

As described in relation to the conventional technology, in inkjet printing, methods that combine a treatment liquid and an inkjet ink are already in use, but in the present invention, a combination of an inkjet ink and a treatment liquid containing a specific amount of a specific material is used.

The treatment liquid is applied to a recording medium prior to printing of the inkjet ink, and is used for forming an ink aggregation layer on the recording medium. The calcium nitrate contained in the ink aggregation layer formed using the treatment liquid (hereafter also referred to as simply "the treatment liquid layer (of the present invention)") dissolves when the aqueous medium is subsequently applied, and dissociates to form nitrate ions and calcium ions. Accordingly, it is thought that when liquid droplets of the inkjet ink containing water and the water-soluble organic solvent contact the treatment liquid layer, the nitrate ions and calcium ions dissociate and are eluted into the liquid droplets of the inkjet ink. These eluted calcium ions diffuse through the ink droplets, and undergo cation-anion interactions with the solid components such as the pigment and resins that exist in a dissolved and/or dispersed state and have an anionic charge, thus causing changes in the state of adsorption. As a result, it is thought that aggregation and precipitation of the solid components and a localized increase in viscosity occur due to a deterioration in the above dissolved and/or dispersed state.

In this description, an "aqueous medium" means a medium formed from a liquid that contains at least water.

Examples of other known coagulants besides calcium nitrate that generate the type of aggregation action described above include cationic resins, acidic compounds and inorganic metal salts other than calcium nitrate. In the ink set of the present invention, calcium nitrate is preferably selected as the coagulant. The reasons for this preference include the characteristic features of the small-sized calcium ions, namely fast diffusion and permeation speeds and a superior aggregation action. Another reason is a characteristic feature of nitrate salts that yields a large endothermic energy upon dissolution in an aqueous medium. In other words, when calcium nitrate dissociates, thermal energy must be absorbed from the aqueous medium, and therefore it is thought that compared with the other coagulants mentioned above, when calcium nitrate is used, a certain period of time is required for the dissociation and elution to occur, and the aggregation action to manifest.

In one embodiment, the inkjet ink contains a glycol ether-based organic solvent (A) represented by general formula (1) shown above (hereafter also referred to as "the specified glycol ether-based organic solvent (A)") and a surfactant. The inventors of the present invention conducted intensive investigations of the effects that water-soluble organic solvents contained in inkjet inks have on the permeability of the ink into recording media. As a result, they discovered that inks containing the specified glycol ether-based organic solvent (A) exhibited particularly superior permeability, and that when used in combination with a surfactant, this effect was further enhanced. In other words, an ink containing a combination of the specified glycol ether-based organic solvent (A) and a surfactant is able to achieve favorable permeability not only into high-absorption substrates such as high-quality papers and liner papers, but also into low-absorption substrates such as coated papers, art papers and cast papers.

In those cases where a treatment liquid layer containing calcium nitrate exists on (the surface of) the recording medium to which the inkjet ink is applied, it is thought that as the inkjet ink penetrates, the calcium nitrate also permeates into the interior of the recording medium. As described above, because it takes some time for the function of the calcium nitrate as a coagulant to manifest, it is thought that the aggregation and thickening of the ink occurs within the interior of the recording medium. As a result, the amount of ink retained on the surface of the recording medium is reduced, enabling printed matter having excellent coating film durability and drying properties and superior printed image quality to be obtained.

Furthermore, when high-absorption substrates are used, it is thought that permeation of the ink proceeds before the ink undergoes aggregation and thickening, resulting in the occurrence of feathering and coalescence and mixing of the liquid droplets. However, in embodiments of the present invention, the endothermic reaction that occurs upon dissociation of the calcium nitrate lowers the liquid temperature of the ink droplets, which causes increases in the viscosity and surface tension, enabling suppression of excessive permeation and bleeding. Moreover, it is thought that the surfactant contained in the ink orients rapidly at the ink liquid droplet interface, enabling suppression of coalescence of the ink liquid droplets.

In one embodiment, the amount of the calcium nitrate that exists in the treatment liquid is preferably within a range from 6.8 to 20.8% by mass relative to the total mass of the treatment liquid. By adjusting the blend amount of the calcium nitrate to a value within this range, the synergistic effects with the ink that constitutes the ink set can be enhanced, enabling printed matter of high image quality and excellent coating film durability and drying properties to be obtained in a stable manner regardless of the recording medium and the printing speed.

Furthermore, the treatment liquid may contain one or more compounds having three or more hydroxyl groups, but in such cases, the amount of these compounds having three or more hydroxyl groups is preferably not more than 15% by mass relative to the total mass of the treatment liquid. In one embodiment, the treatment liquid preferably does not contain any compounds having three or more hydroxyl groups. In other words, the above amount may be 0% by mass.

High-quality papers and some coated papers have hydroxyl group and carboxyl group functional groups on the paper surface and in the paper interior. Accordingly, it is thought that when the treatment liquid contains an aforementioned compound having three or more hydroxyl groups, interactions such as hydrogen bonding occurs between the above functional groups and the compound having three or more hydroxyl groups. As a result, even if a treatment which, for example, applies thermal energy to the treatment liquid is included, the compound having three or more hydroxyl groups tends to be readily retained in the recording medium. If an inkjet ink is then applied to the recording medium having a treatment liquid layer in this type of state, then interactions occur between the hydroxyl groups that exist in the compound having three or more hydroxyl groups and the calcium ions, and there is a possibility that the effect of the calcium nitrate as a coagulant may be unsatisfactory.

For these types of reasons, in one embodiment, limiting the amount of compounds having three or more hydroxyl groups in the treatment liquid enables printed matter of excellent image quality to be produced regardless of the recording medium.

As described above, it is thought that by combining the above treatment liquid and the above ink, printed matter of high image quality with excellent coating film durability and drying properties and good suppression of image defects such as color mixing can be produced regardless of the recording medium and the printing conditions such as the printing speed. It should be noted that the mechanisms described above are merely conjecture, and in no way limit the present invention.

Next, the constituent elements of the ink set are described in further detail.

1A. Treatment Liquid

In one embodiment, the treatment liquid described above contains at least a coagulant, and contains calcium nitrate as the coagulant. The constituent components of the treatment liquid are described below in further detail.

<Calcium Nitrate>

The treatment liquid contains calcium nitrate as a coagulant. Among the various possible coagulants, in those cases where calcium nitrate is used, dissolution and/or dispersion of the solid components that exist in the inkjet ink is reduced, and by causing aggregation and precipitation of the solid components, together with localized thickening, color mixing caused by ink droplet coalescence can be ameliorated, and images of high image quality can be more easily obtained regardless of the printing conditions. As described above, the calcium ions generated upon dissociation of the calcium nitrate have a small ion size, and therefore move and diffuse readily within the ink droplets and through the interior of the recording medium. Further, the valence of the ions is divalent, meaning compared with monovalent cations, the aggregation action and insolubilization capability are superior. Accordingly, calcium ions that have dissociated inside the ink droplets immediately move to all regions within the ink droplets, and can reduce the dissolution and/or dispersion action of the solid components having an anionic charge such as the pigment and the resins. As a result, even during high-speed printing, color mixing is unlikely to occur, and printed matter of high image quality can be obtained. Moreover, as a result of the large endothermic energy upon dissolution in aqueous media that represents a characteristic of nitrate salts, combination of the treatment liquid with the ink described above enables printed matter having excellent coating film durability and drying properties to be obtained.

Furthermore, as mentioned above, in one embodiment, the blend amount of the calcium nitrate in the treatment liquid is preferably within a range from 6.8 to 20.8% by mass relative to the total mass of the treatment liquid. By employing such an embodiment, the synergistic effects with the inkjet ink can be further enhanced, insufficient coverage and bleeding can be suppressed, and printed matter having excellent coating film durability and drying properties can be obtained. Further, in order to achieve excellent image quality equivalent to that obtainable with offset printing, even with extremely high-speed printing, the above blend amount is preferably from 7.0 to 20.5% by mass, and particularly preferably from 7.5 to 20% by mass. The blend amount of the calcium nitrate mentioned above represents the blend amount as anhydrous calcium nitrate.

<Compounds Having Three or More Hydroxyl Groups>

As already mentioned above, from the viewpoint of ensuring satisfactory manifestation of the effects of the calcium ions as a coagulant, the amount of compounds having three or more hydroxyl groups in the treatment liquid is preferably not more than 15% by mass relative to the total mass of the treatment liquid. In the treatment liquid, it is thought that the higher the amount of compounds having three or more hydroxyl groups, the more the actions of the calcium ions are impaired, and therefore the amount of these compounds having three or more hydroxyl groups in the treatment liquid is preferably as low as possible. From this viewpoint, the amount of compounds having three or more hydroxyl groups in the treatment liquid, relative to the total mass of the treatment liquid, is more preferably not more than 12% by mass, even more preferably not more than 9% by mass, and particularly preferably not more than 5% by mass, and a treatment liquid that contains substantially none of these compounds is particularly desirable. The expression "contains substantially none" means that no such compounds are added intentionally. Accordingly, the expression does not exclude the existence of small amounts of by-products or impurities in other materials, and in the present description, indicates an amount of these compounds of 1% by mass or less.

The compound having three or more hydroxyl groups may be liquid or solid at normal temperature (25° C.). Examples of specific compounds include chain-like polyol compounds such as glycerol, trimethylolpropane, 1,2,4-butanetriol, 1,2,6-hexanetriol, diglycerol, erythritol, threitol, ribitol, xylitol, sorbitol, mannitol and galactitol; alkylene oxide adducts of these compounds; polyol compounds having a cyclic structure such as glucose, sucrose, maltose, lactose, cellobiose, trehalose, fructose, isomalt, lactitol and maltitol; and cyclitol compounds such as pinpollitol, bornesitol, ononitol, pinitol, inositol, quinic acid and shikimic acid. When using these compounds, a single compound may be used alone, or two or more compounds may be combined.

<Organic Solvent>

In one embodiment, the treatment liquid may also contain an organic solvent. By including an organic solvent, the moisture retention, drying properties and wetting properties of the treatment liquid can be better adjusted. Although there are no particular limitations on the organic solvents that may be used in the treatment liquid, inclusion of a water-soluble organic solvent is preferred. These organic solvents are deemed to not include the pH adjusters described above. Further, in this description, the "organic solvent" included in the treatment liquid is deemed to not include the compounds having three or more hydroxyl groups described above.

From the viewpoints of the affinity with water and the calcium nitrate, and the solubility of the calcium nitrate, the water-soluble organic solvent used in the treatment liquid is preferably a water-soluble organic solvent containing at least one or two hydroxyl groups in the molecular structure.

Specific examples of water-soluble organic solvents containing one or two hydroxyl groups in the molecular structure that can be used favorably in the treatment liquid include the following:

monohydric alcohols such as methanol, ethanol, 1-propanol, 2-propanol, 1-butanol, 2-butanol, 3-methoxy-1-butanol, and 3-methoxy-3-methyl-1-butanol;

dihydric alcohols (glycols) such as 1,2-ethanediol (ethylene glycol), 1,2-propanediol (propylene glycol), 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-methylpentan-2,4-diol, 2-ethyl-1,3-hexanediol, 1,2-octanediol, diethylene glycol, triethylene glycol, dipropylene glycol, butylene glycol, and dibutylene glycol; and glycol monoalkyl ethers such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, dipropylene glycol monopropyl ether, tripropylene glycol monomethyl ether, and tripropylene glycol monoethyl ether.

Among the compounds listed above, the use of a monohydric alcohol such as ethanol, 1-propanol, 2-propanol, 3-methoxy-1-butanol or 3-methoxy-3-methyl-1-butanol is particularly preferred. Further, one of the aforementioned water-soluble organic solvents having one or two hydroxyl groups in the molecular structure may be used alone, or a combination of two or more such organic solvents may be used.

In one embodiment, the blend amount of the water-soluble organic solvent having one or two hydroxyl groups in the molecular structure contained in the treatment liquid, relative to the total mass of the treatment liquid, is preferably within a range from 0.1 to 30% by mass, more preferably from 1 to 25% by mass, and particularly preferably from 1 to 20% by mass. By adjusting the blend amount of the water-soluble organic solvent so as to fall within the above range, a treatment liquid can be provided that easily yields excellent moisture retention and coating film durability, as well as superior drying properties and wetting properties. Further, regardless of the printing method used for the treatment liquid, stable printing can be achieved over long periods.

In one embodiment, the treatment liquid may also include other organic solvents. Specific examples of other organic solvents that may be used include the following:

glycol dialkyl ethers such as diethylene glycol dimethyl ether, diethylene glycol methyl ethyl ether, diethylene glycol butyl methyl ether, diethylene glycol diethyl ether, triethylene glycol dimethyl ether, triethylene glycol methyl ethyl ether, triethylene glycol butyl methyl ether, triethylene glycol diethyl ether, tetraethylene glycol dimethyl ether, tetraethylene glycol methyl ethyl ether, tetraethylene glycol butyl methyl ether, and tetraethylene glycol diethyl ether;

nitrogen-containing solvents such as 2-pyrrolidone, N-methylpyrrolidone, N-ethylpyrrolidone, ε-caprolactam, 3-methyl-2-oxazolidinone, 3-ethyl-2-oxazolidinone, N,N-dimethyl-β-methoxypropionamide, N,N-dimethyl-β-ethoxypropionamide, N,N-dimethyl-β-butoxypropionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β-octoxypropionamide, N,N-diethyl-β-butoxypropionamide, N,N-diethyl-β-pentoxypropionamide, N,N-diethyl-β-hexoxypropionamide, N,N-diethyl-β-heptoxypropionamide, and N,N-diethyl-β-octoxypropionamide; and heterocyclic compounds such as γ-butyrolactone, γ-valerolactone, δ-valerolactone, and ε-caprolactone. One of the organic solvents listed above may be used alone, or a combination of two or more solvents may be used.

The total blend amount of the other organic solvents described above in the treatment liquid, relative to the total mass of the treatment liquid, is preferably within a range from 0.1 to 50% by mass, more preferably from 0.15 to 30% by mass, and particularly preferably from 0.2 to 25% by mass. By adjusting the blend amount of the above other water-soluble organic solvents so as to fall within the above range, a treatment liquid having excellent drying properties, moisture retention and wetting properties can be obtained, and any deterioration in the coating film durability cause by residual organic solvent can be prevented.

In one embodiment, the amount of organic solvents having a boiling point of 240° C. or higher in the treatment liquid is preferably less than 10% by mass relative to the total mass of the treatment liquid. The amount of these solvents may be 0% by mass. By ensuring either that the treatment liquid contains no organic solvents having a boiling point of 240° C. or higher, or if such solvents are present, that the blend amount is adjusted to a value within the above range, satisfactory drying of the treatment liquid can be achieved during high-speed printing. Further, because the organic solvent can be prevented from penetrating into and being retained within the interior of the recording medium, the aggregation action of the calcium nitrate and the coating film durability can be improved. When calculating the amount of organic solvents having a boiling point of 240° C. or higher, the amounts of any compounds having three or more hydroxyl groups that have a boiling point of 240° C. or higher (and are liquid at 25° C.), and the amounts of those water-soluble organic solvents having one or two hydroxyl groups within the molecular structure that have a boiling point of 240° C. or higher are included within the calculation of the amount of the aforementioned organic solvents having a boiling point of 240° C. or higher.

<Surfactant>

In one embodiment, the treatment liquid described above preferably also contains a surfactant in order to adjust the surface tension and improve the wettability of the recording medium. Many types of surfactants exist, including nonionic surfactants, anionic surfactants and cationic surfactants, but in the case of the treatment liquid described above, a nonionic surfactant is preferably selected. When a nonionic surfactant is used, the wetting properties of the treatment liquid can be easily improved without impairing the aggregation function of the calcium nitrate.

Many types of nonionic surfactants are known, including acetylene-based, siloxane-based, acrylic-based and fluorine-based surfactants. From the viewpoint of achieving a combination of favorable wetting properties for the treatment liquid, good wetting properties for the subsequently applied inkjet ink, and favorable printing stability for the treatment liquid, the use of an acetylene-based surfactant and/or a siloxane-based surfactant is preferred, and the use of at least an acetylene-based surfactant is particularly preferred.

The surfactant that is used may be synthesized using conventional methods, or a commercially available product may be used. When the surfactant is selected from among commercially available products, examples of siloxane-based surfactants that can be used include BY16-201, FZ-77, FZ-2104, FZ-2110, FZ-2162, F-2123, L-7001, L-7002, SF8427, SF8428, SH3749, SH8400, 8032 Additive and SH3773M (all manufactured by Dow Corning Toray Co., Ltd.), TEGO Glide 410, TEGO Glide 432, TEGO Glide 435, TEGO Glide 440, TEGO Glide 450, TEGO Twin 4000, TEGO Twin 4100, TEGO Wet 250, TEGO Wet 260, TEGO Wet 270 and TEGO Wet 280 (all manufactured by Evonik Degussa GmbH), SAG-002 and SAG-503A (manufactured by Nissin Chemical Co., Ltd.), BYK-331, BYK-333, BYK-345, BYK-346, BYK-347, BYK-348, BYK-349, BYK-UV3500, and BYK-UV3510 (all manufactured by BYK-Chemie GmbH), and KF-351A, KF-352A, KF-353, KF-354L, KF355A, KF-615A, KF-640, KF-642, and KF-643 (all manufactured by Shin-Etsu Chemical Co., Ltd.).

Further, examples of acetylene-based surfactants that can be used include Surfynol 61, 104E, 104H, 104A, 104BC, 104DPM, 104PA, 104PG-50, 420, 440, 465, 485, SE and SE-F, and Dynol 604 and 607 (all manufactured by Air Products and Chemicals, Inc.), and OLFINE E1004, E1010, E1020, PD-001, PD-002W, PD-004, PD-005, EXP. 4001, EXP. 4200, EXP. 4123 and EXP. 4300 (all manufactured by Nissin Chemical Co., Ltd.).

One of the above surfactants may be used alone, or a combination of two or more surfactants may be used.

In the coating method described below, in order to form a uniform aggregation layer, it is necessary that the surfactant orients rapidly at the surface, and lowers and stabilizes the surface tension. From these viewpoints, inclusion of a compound represented by general formula (2) shown below as the acetylene-based surfactant is particularly desirable.

[Chemical formula 1]

General formula (2)

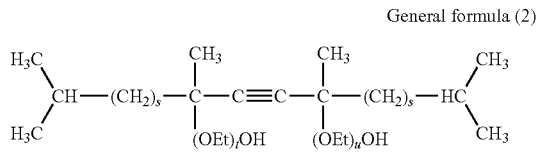

In general formula (2), s represents an integer of 1 to 3, t represents an integer of 0 or greater, u represents an integer of 0 or greater, and t+u is an integer of 1 to 30. Further, Et represents an ethylene group. Among the various possibilities, compounds of general formula (2) in which s is 1 or 2 and t+u is an integer of 5 to 20 are more preferred.

Among the commercially available surfactants listed above, examples of compounds represented by the above general formula (2) include Surfynol 420, 440, 465 and 485, Dynol 604 and 607, and OLFINE E1004 and E1010. Among these, Surfynol 465, Dynol 607 and OLFINE E1010 correspond with a compounds of general formula (2) in which s is 1 or 2, and t+u represents an integer of 2 to 20.

In those cases where a siloxane-based surfactant is used, in order to adjust the functionality as a surfactant and the solubility in aqueous media, the use of a modified siloxane-based surfactant containing any of various introduced organic groups is preferred. Among such surfactants, polyether-modified siloxane-based surfactants using a polyether group as an organic group are preferred. In the case of polyether-modified siloxane-based surfactants, the hydrophilicity or hydrophobicity of the surfactant can be controlled as desired by adjusting the number of ethylene oxide groups or propylene oxide groups that constitute the polyether, and the speed of orientation of the surfactant at the interface can also be increased, and therefore these surfactants can be used particularly favorably.

In one embodiment, in those cases where the treatment liquid contains a surfactant, the amount added of the surfactant, relative to the total mass of the treatment liquid, is preferably within a range from 0.1% to 3.0% by mass, and particularly preferably from 0.15 to 2.0% by mass. By adding the surfactant in an amount that falls within the above range, satisfactory wetting of the recording medium can be achieved regardless of the coating method and even in the case of high-speed printing, and any deterioration in the coating quality such as cissing can be suppressed. However, the blend amount of the surfactant is preferably determined with due consideration of the surface tension of the inkjet ink described below.

In the ink set, from the viewpoint of preventing bleeding in the printed matter, the surface tension of the treatment liquid is preferably at least as high as the surface tension of the inkjet ink. By ensuring that the surface tension of the treatment liquid is greater than the surface tension of the inkjet ink, the amount of surfactant oriented at the coating film surface when applying the treatment liquid to the recording medium can be reduced, and any excessive reduction in the surface energy of the treatment liquid layer can be prevented. As a result, the wettability of the subsequently printed inkjet ink is favorable, and printed matter of high image quality with no bleeding can be obtained.

<Binder Resin>

In one embodiment, the treatment liquid may also contain a binder resin. A binder resin is a resin that does not participate in the reaction between the inkjet ink and the treatment liquid. By also including a binder resin, the water resistance of the printed matter can be improved, meaning the printed matter can be used in a variety of different applications. Generally, water-soluble resins and resin microparticles are known as binder resins. Either of these types of binder resins may be used in the treatment liquid. In terms of mixing instantly with the inkjet ink, thereby enabling the aggregation function of the treatment liquid to manifest more effectively during high-speed printing, selection of a water-soluble resin is preferred.

The amount of the above binder resin is preferably specified relative to the amount of metal ions. Specifically, the mass ratio of the amount of the above binder resin relative to the amount of metal ions contained in the treatment liquid, expressed as an amount of the binder resin relative to a value of 1 for the amount of metal ions, is preferably greater than 0 but less than 50, and particularly preferably greater than 0 but less than 30. When the mass ratio falls within this range, the water resistance of the printed matter improves, and printed matter of high image quality can be obtained, with no waviness (a phenomenon in which a portion of the recording medium absorbs water, leading to localized expansion and the formation of a wave-like shape) or curling (curving of the recording medium caused by moisture).

There are no particular limitations on the types of binder resins that may be used in the treatment liquid. Among the various possible resins, nonionic water-soluble resins are preferred due to their effectiveness in improving the water resistance and suppressing waviness and curling. Provided the basic performance of the treatment liquid can be maintained, a resin that also includes an added anionic unit or cationic unit in the nonionic water-soluble resin may be used. Specific examples of the binder resin include polyethyleneimines, polyamides, various quaternary ammonium salt group-containing water-soluble resins, polyacrylamides, polyvinylpyrrolidones, polyalkylene oxides, starches, water-soluble celluloses such as methyl cellulose, hydroxy cellulose, carboxymethyl cellulose, hydroxymethyl cellulose, hydroxypropyl cellulose and hydroxypropyl methylcellulose, polyvinyl methyl ethers, polyvinyl acetals, polyvinyl alcohols, and modified products of the above resins. Further, provided stability with the calcium nitrate is maintained, (meth)acrylic resins, styrene-(meth)acrylic resins, maleic acid resins, styrene-maleic acid resins, urethane resins, and ester resins and the like may also be used. The present invention is, of course, not limited to these resins.

In this description, the term "(meth)acrylic" means "acrylic" and/or "methacrylic".

In terms of being able to absorb the liquid components in the subsequently printed inkjet ink, thereby improving the drying properties, particularly during high-speed printing, the use of at least one resin selected from the group consisting of polyvinyl alcohols, polyvinylpyrrolidones, polyvinyl acetals, polyalkylene oxides, cellulose derivatives, (meth)acrylic resins and styrene-(meth)acrylic resins as the binder resin is preferred. The use of at least one resin selected from the group consisting of polyvinyl alcohols, (meth)acrylic resins and styrene-(meth)acrylic resins is particularly preferred. These resins offer the advantages of having the types of physical properties required for inkjet ink treatment liquids such as favorable transparency, coating film durability and binder strength to pigments, as well as being readily available, and being available in a variety of forms including modified products.

Among the above resins, in the case of polyvinyl alcohols, in terms of enabling suppression of any reduction in the pH of the treatment liquid over time, it is most desirable to use a polyvinyl alcohol having a degree of saponification of at least 95% (a completely saponified product). In other words, by using a polyvinyl alcohol having a degree of saponification of at least 95%, in addition to the effects of improving the water resistance and suppressing waviness and curling, a treatment liquid layer of excellent gloss, transparency and inkjet ink absorption can be obtained, and a treatment liquid that exhibits excellent pH stability over time can be obtained. Further, in terms of (meth)acrylic resins and/or styrene-(meth)acrylic resins, in terms of preventing reaction with the calcium nitrate in the treatment liquid, obtaining a treatment liquid that exhibits favorable pH and viscosity stability over time and has an excellent aggregation effect, and obtaining printed matter with excellent water resistance and gloss, and superior suppression of waviness and curling, selection of a resin having an acid value of not more than 100 is most desirable. The acid value can be measured using the same method as that described below for the pigment dispersing resin.

In one embodiment, the number average molecular weight (Mn) of the binder resin used in the treatment liquid is preferably within a range from 3,000 to 90,000, and particularly preferably from 4,000 to 86,000. Binder resins having Mn value within this range generally exhibit the desired water resistance. Further, waviness or curling of the recording medium caused by swelling of the treatment liquid layer is less likely to occur. Furthermore, movement of the calcium ions is not impaired, meaning any deterioration in the aggregation effect can be suppressed. Moreover, by using a binder resin having Mn value within the above range, the viscosity of the treatment liquid can be easily adjusted to a value within the preferred range.

The number average molecular weight of the binder resin can be measured by typical methods. In one example, Mn can be measured as a polystyrene-equivalent number average molecular weight, using a TSKgel column (manufactured by Tosoh Corporation) and a GPC (HLC-8120GPC, manufactured by Tosoh Corporation) fitted with an RI detector, using THF as the eluent.

<pH Adjuster>

In one embodiment, the treatment liquid may also contain a pH adjuster. A pH adjuster is a material that suppresses pH fluctuations caused by environmental changes, such as a reduction in pH caused by the absorption of carbon dioxide from the atmosphere, and has the function of maintaining the pH of the treatment liquid at a constant level. Any compound having a pH-adjusting function may be selected and used as the pH adjuster.

For example, in those cases where basification is required, although there are no particular limitations, alkanolamines such as dimethylethanolamine, diethanolamine, triethanolamine and N-methyldiethanolamine; other primary amines, secondary amines, tertiary amines and quaternary ammonium salts; ammonia water; alkali metal hydroxides such as lithium hydroxide, sodium hydroxide and potassium hydroxide; alkali metal carbonates such as lithium carbonate, sodium carbonate, sodium hydrogen carbonate and potassium carbonate; and alkali metal acetates such as lithium acetate and sodium acetate may be used.

Further, in those cases where acidification is required, although there are no particular limitations, various inorganic acids such as hydrochloric acid, sulfuric acid, nitric acid, phosphoric acid and boric acid; and various organic acids such as acetic acid, citric acid, succinic acid, tartaric acid, malic acid, fumaric acid, malonic acid, ascorbic acid and glutamic acid may be used.

Any of the above pH adjusters may be used alone, or a combination of two or more pH adjusters may be used. Among the various possibilities, in terms of not affecting the aggregation action of the calcium nitrate, a pH adjuster that does not contain a metal ion component is preferred.

For example, among the compounds listed above, examples of compounds that do not contain a metal ion component include alkanolamines such as dimethylethanolamine, diethanolamine, triethanolamine and N-methyldiethanolamine; other primary amines, secondary amines, tertiary amines and quaternary ammonium salts; ammonia water; various inorganic acids such as hydrochloric acid, sulfuric acid, nitric acid, phosphoric acid and boric acid; and various organic acids such as acetic acid, citric acid, succinic acid, tartaric acid, malic acid, fumaric acid, malonic acid, ascorbic acid and glutamic acid. These compounds can be used particularly favorably as pH adjusters that do not contain a metal ion component.

The blend amount of the pH adjuster is preferably within a range from 0.01 to 5% by mass relative to the total mass of the treatment liquid. By ensuring that the blend amount of the pH adjuster falls within this range, pH adjustment of the treatment liquid is possible without impairing the function of the calcium nitrate in the treatment liquid. Further, a blend amount within the above range is also preferred in terms of safety and odor. Moreover, in terms of maintaining the pH in a stable manner even during lengthy or continuous treatment liquid coating, and ensuring satisfactory drying properties for the treatment liquid even during high-speed coating, the above blend amount is more preferably within a range from 0.15 to 3% by mass.

From the viewpoint of preventing drying and solidification inside the coating device during the treatment liquid coating process, the boiling point of the pH adjuster is preferably at least 50° C. On the other hand, from the viewpoint of preventing any deterioration in the drying properties during high-speed printing, the boiling point of the pH adjuster is preferably not higher than 400° C.

The molecular weight of the above pH adjuster, expressed as a weight average molecular weight (Mw), is preferably not more than 500. By using a pH adjuster having this type of molecular weight, coating irregularities of the treatment liquid during high-speed printing can be improved, and the viscosity of the treatment liquid can be kept within the preferred range. In those cases where the pH adjuster is composed of a single material, the above weight average molecular weight may be read as the molecular weight of the single material.

<Water>

In one embodiment, the treatment liquid preferably contains water, and the amount of water is preferably within a range from 10 to 90% by mass relative to the total mass of the treatment liquid.

<Other Components>

The treatment liquid may, if necessary, also contain other additives such as antifoaming agents and preservatives in order to achieve certain desired physical property values. In those cases where these types of additives are used, the amount added is preferably at least 0.01% by mass but not more than 10% by mass relative to the total mass of the treatment liquid.

<Method for Producing Treatment Liquid>

In one embodiment, the treatment liquid contains calcium nitrate and water, and may also contain, as required, an organic solvent, surfactant, binder resin, pH adjuster and components selected appropriately from among the aforementioned additives, and can be produced by a method in which these components are combined and then stirred and mixed, and the resulting mixture is then filtered if required. However, the method for producing the treatment liquid is not limited to this method.

During the step of conducting stirring and mixing, the mixture may be heated at a temperature within a range from 40 to 100° C. if necessary. However, in those cases where resin microparticles are used as the binder resin, the heating is preferably performed at a temperature no higher than the MFT (minimum film-forming temperature) of the resin microparticles.

Further, during the filtration step, although there are no particular limitations on the filter pore size, provided that coarse particles and dust can be removed, the filter pore size is preferably from 0.3 to 100 μm, and more preferably from 0.5 to 50 μm. When filtration is performed, a single type of filter may be used, or a combination of a plurality of filters may be used.

<Physical Properties of Treatment Liquid>

In one embodiment, the pH of the treatment liquid is preferably within a range from 3.5 to 11. Provided the pH falls within this range, the treatment liquid is neither strongly acidic nor strongly basic. As a result, excessive acceleration of the aggregation action can be suppressed, and printed matter can be obtained that achieves a combination of suppression of banding caused by inadequate coverage, and improved image quality due to favorable aggregation and precipitation of the solid components and appropriate localized thickening. Further, damage such as corrosion of the members used for the printing device housing the treatment liquid, and particularly metal members, can also be suppressed. Moreover, from the viewpoints of enhancing the above effects, and enabling printed matter of high image quality to be obtained across a broader range of ink compositions, the pH range is more preferably from 3.5 to 9.5, and particularly preferably from 4 to 8. If the pH is within a range from 4 to 8, then superior suppression of corrosion of all manner of metals can be achieved, and coated products with no irregularities can be obtained in a stable manner over a long period of time by applying the treatment liquid to recording media.

The above pH of the treatment liquid can be measured by conventional methods. For example, measurement can be performed using a desktop pH meter F-72 manufactured by Horiba, Ltd., and either a standard ToupH electrode or a sleeve ToupH electrode.

In one embodiment, the treatment liquid preferably has a viscosity at 25° C. within a range from 5 to 100 mPa·s. Provided the viscosity of the treatment liquid satisfies this range, the treatment liquid can be applied without coating irregularities, and the various printing methods described below can be employed. Further, even in the case of high-speed printing, regardless of the treatment liquid coating method used, from the viewpoints of achieving uniform application of the treatment liquid to the recording medium and obtaining printed matter of high image quality, the viscosity of the treatment liquid at 25° C. is more preferably within a range from 5 to 80 mPa·s. This viscosity is even more preferably from 5 to 60 mPa·s, and most preferably from 5 to 30 mPa·s.

Depending on the viscosity of the treatment liquid, measurement of the viscosity of the treatment liquid may be performed, for example, using an E-type viscometer (TVE25L viscometer, manufactured by Toki Sangyo Co., Ltd.) or a B-type viscometer (TVB 10 viscometer, manufactured by Toki Sangyo Co., Ltd.).

From the viewpoint of ensuring satisfactory wettability of a variety of recording media, the surface tension of the treatment liquid at 25° C. is preferably within a range from 20 to 75 mN/m, more preferably from 21 to 65 mN/m, and particularly preferably from 22 to 45 mN/m. Further, as described below, the surface tension of the treatment liquid is preferably at least as high as the surface tension of the inkjet ink.

The surface tension of the treatment liquid can be measured, for example, using a surface tensiometer (CBVPZ manufactured by Kyowa Interface Science Co., Ltd.), using the platinum plate method in an atmosphere at 25° C.

1B. Inkjet Ink

The constituent elements of the inkjet ink are described below in further detail.

<Pigment>

In one embodiment, the inkjet ink preferably contains a pigment as the colorant. Pigments have favorable water resistance, light resistance, weather resistance and gas resistance and the like, and when used with the treatment liquid of the embodiment described above during high-speed printing, exhibit a faster aggregation speed than dyes. Conventional organic pigments and inorganic pigments may be used as the pigment. The amount of these pigments, relative to the total mass of the inkjet ink, is preferably at least 2% by mass but not more than 15% by mass, more preferably at least 2.5% by mass but not more than 12% by mass, and particularly preferably at least 3% by mass but not more than 10% by mass. By ensuring that the pigment content falls within the above range, satisfactory color development can be achieved even with one-pass printing. Further, the viscosity of the inkjet ink can be kept within a range that is appropriate for inkjet printing, and as a result, the long-term printing stability can be favorably maintained. Specific examples of the pigment are listed below.

Examples of cyan organic pigments that can be used in the present invention include C.I. Pigment Blue 1, 2, 3, 15:3, 15:4, 15:6, 16, 22, 60, 64 and 66. Of these, in terms of offering superior color development and light resistance, the selection of one or more pigments selected from the group consisting of C.I. Pigment Blue 15:3 and 15:4 is preferred. Further, in order to improve the color reproducibility, a green pigment such as C.I. Pigment Green 7, 36, 43 or 58 may be mixed with the cyan pigment.

Examples of magenta organic pigments include C.I. Pigment Red 5, 7, 12, 22, 23, 31, 48 (Ca), 48 (Mn), 49, 52, 53, 57 (Ca), 57:1, 112, 122, 146, 147, 150, 185, 238, 242, 254, 255, 266, 269 and 282, and C.I. Pigment Violet 19, 23, 29, 30, 37, 40, 43 and 50.

Of these, in terms of offering superior color development and light resistance, one or more pigments selected from the group consisting of C.I. Pigment Red 122, 146, 150, 185, 202, 209, 254, 266, 269 and 282 and C.I. Pigment Violet 19 is preferred. Among these pigments, quinacridone pigments such as C.I. Pigment Red 122, 202, 209 and 282 and C.I. Pigment Violet 19 yield particularly superior color development properties when used in combination with the treatment liquid of the embodiment described above, and also yield printed matter having superior weather resistance, and are consequently particularly desirable.

From the viewpoint of further enhancing the color development properties, the use of a solid solution pigment containing a quinacridone pigment as the magenta organic pigment is also preferred.

Specific examples include a solid solution pigment containing C.I. Pigment Red 122 and C.I. Pigment Violet 19, a solid solution pigment containing C.I. Pigment Red 202 and C.I. Pigment Violet 19, a solid solution pigment containing C.I. Pigment Red 209 and C.I. Pigment Violet 19, a solid solution pigment containing C.I. Pigment Red 282 and C.I. Pigment Violet 19, a solid solution pigment containing C.I. Pigment Red 122 and C.I. Pigment Red 146, a solid solution pigment containing C.I. Pigment Red 122 and C.I. Pigment Red 150, a solid solution pigment containing C.I. Pigment Red 122 and C.I. Pigment Red 254, and a solid solution pigment containing C.I. Pigment Red 122 and C.I. Pigment Red 269.

Examples of yellow organic pigments include C.I. Pigment Yellow 10, 11, 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185 and 213. Of these, in terms of offering superior color development, one or more pigments selected from the group consisting of C.I. Pigment Yellow 13, 14, 74, 120, 139, 180, 185 and 213 is preferred.

Examples of black organic pigments include aniline black, Lumogen black, and azomethine azo black. Further, a plurality of color pigments selected from among the cyan pigments, magenta pigments and yellow pigments described above, and special color pigments such as the orange pigments, green pigments and brown pigments described below, may also be used to form a black pigment.

In one embodiment, special color pigments such as orange pigments, green pigments and brown pigments may also be used as the pigment for the inkjet ink. Specific examples include C.I. Pigment Orange 16, 36, 43, 51, 55, 59, 61, 64 and 71, C.I. Pigment Green 7, 36, 43 and 58, and C.I. Pigment Brown 23, 25 and 26. By using these special color pigments, printed matter having an even broader color gamut can be produced.

There are no particular limitations on the types of inorganic pigments that may be used. Examples include black pigments such as carbon blacks and iron oxide, and white pigments such as titanium oxide.

The carbon black pigment may be a carbon black produced using the furnace method or the channel method. Of the various carbon blacks, a carbon black having properties including a primary particle size of 11 to 50 nm, a specific surface area measured by the BET method of 50 to 400 $m^2/g$, a volatile fraction of 0.5 to 10% by mass, and a pH of 2 to 10 is preferred. Examples of commercially available products having these types of properties include: No. 25, 30, 33, 40, 44, 45, 52, 850, 900, 950, 960, 970, 980, 1000, 2200B, 2300, 2350 and 2600, and MA7, MA8, MA77, MA100 and MA230 (manufactured by Mitsubishi Chemical Corporation), RAVEN 760UP, 780UP, 860UP, 900P, 1000P, 1060UP, 1080UP and 1255 (manufactured by Columbian Carbon Company), REGAL 330R, 400R, 660R and MOGUL L (manufactured by Cabot Corporation), and Nipex 160IQ, 170IQ, 35 and 75, PrinteX 30, 35, 40, 45, 55, 75, 80, 85, 90, 95 and 300, Special Black 350 and 550, and Nerox 305, 500, 505, 600 and 605 (manufactured by Orion Engineered Carbons S.A.), and any of these carbon blacks can be used favorably.

Titanium oxide can be used favorably as a white inorganic pigment, and either the anatase form or rutile form may be used, but use of the rutile form is preferred from the viewpoint of increasing the opacity of the printed matter. Further, titanium oxide produced by either the chlorine method or the sulfuric acid method may be used, but using titanium oxide produced by the chlorine method is preferred in terms of obtaining a higher degree of whiteness.

The use of titanium oxide having a surface that has been treated with an inorganic compound and/or an organic compound is preferred. Examples of the inorganic compound include compounds containing one or more of silicon, aluminum, zirconium, tin, antimony and titanium, as well as hydrates of these compounds. Further, examples of the organic compound include polyhydric alcohols and alkanolamines and derivatives thereof, higher fatty acids and metal salts thereof, and organometallic compounds. Among these, polyhydric alcohols and derivatives thereof yield a high degree of hydrophobization of the titanium oxide surface, enabling an improvement in the dispersion stability, and can therefore be used particularly favorably.

In order to adjust the hue or color development of the printed matter to a desired range, a mixture of a plurality of the above pigments may be used. For example, in order to improve the color tone at low print ratios, a small amount of one or more pigments selected from among cyan organic pigments, magenta organic pigments, orange organic pigments and brown organic pigments may be added to a black ink that uses a carbon black pigment.

<Pigment Dispersing Resin>

In the inkjet ink, examples of methods for stably dispersing the above pigment and maintaining that dispersion include: (1) methods of achieving dispersion by adsorbing a water-soluble pigment dispersing resin to the pigment surface, (2) methods of achieving dispersion by adsorbing a water-soluble and/or water-dispersible surfactant to the pigment surface, (3) methods of chemically or physically introducing a hydrophilic functional group at the pigment surface, thereby achieving dispersion in the ink without requiring a pigment dispersing resin or a surfactant (self-dispersing pigments), and (4) methods of achieving dispersion in the ink by coating the pigment with a water-insoluble resin, and also using a water-soluble pigment dispersing resin or surfactant as required.

In the inkjet ink, the pigment is preferably dispersed using a method other than the above method (3) (namely, a method that uses a self-dispersing pigment). The ink set of the present invention intentionally uses the insolubilization caused by the calcium ions of the treatment liquid to suppress image defects such as color mixing. Accordingly, enabling anion-cation interaction reactions and adsorption equilibrium movement reactions between the calcium ions and the high-molecular weight components such as the aforementioned resin and surfactant enhances the thickening and fluidity reduction effects caused by the pigment component, enabling the image defects mentioned above to be suppressed even during high-speed printing.

Moreover, of the methods described above, the selection of method (1) or (4) is preferred. In other words, the pigment is more preferably dispersed using a pigment dispersing resin. Of these, selecting the above method (1) that uses a water-soluble pigment dispersing resin is particularly desirable.

With the methods that use a pigment dispersing resin, by appropriate investigation and selection of the composition and molecular weights of the monomers that constitute the pigment dispersing resin, the resin adsorption capability to the pigment and the electric charge of the pigment dispersing resin can be easily adjusted. As a result, the pigment dispersing resin is able to impart good dispersion stability to fine pigments, and can control the ability of the treatment liquid to reduce the dispersibility of the pigment. The above term "pigment dispersing resin" is defined as a generic term for resins that contribute to dispersion of the pigment, including the water-soluble pigment dispersing resins used in the above method (1) or (4), and the water-insoluble resins used in the above method (4).

There are no particular limitations on the type of pigment dispersing resin, and examples of resins that may be used include (meth)acrylic resins, styrene-(meth)acrylic resins, maleic acid resins, styrene-maleic acid resins, urethane resins, and ester resins. In one embodiment, in terms of having a greater range of selectable materials, in terms of ease of synthesis, and in terms of achieving an appropriate aggregation speed due to the charge neutralization and insolubilization of the calcium nitrate, the use of a (meth) acrylic resin or a styrene-(meth)acrylic resin is particularly preferred. The pigment dispersing resin may be synthesized using a conventional method, or a commercially available resin may be used.

In one embodiment, the pigment dispersing resin preferably includes an introduced alkyl group of 8 to 36 carbon atoms. When the alkyl group in the pigment dispersing resin has 8 to 36 carbon atoms, the viscosity of the pigment dispersion can be lowered, superior dispersion stability can be achieved, and better viscosity stability can be more easily achieved. Further, the thickening and fluidity reduction effects caused by the pigment component following the anion-cation interaction reaction or adsorption equilibrium movement reaction with the calcium ions are extremely large.

The number of carbon atoms in the alkyl group is preferably from 10 to 34, more preferably from 12 to 30, and even more preferably from 18 to 24. Provided the number of carbon atoms in the alkyl group is within the range from 8 to 36, the group may be linear or branched. Although either type of group may be used, a linear alkyl group is preferred. Examples of the linear alkyl group include an octyl group (C8), decyl group (C10), lauryl group (C12), myristyl group (C14), cetyl group (C16), stearyl group (C18), arachyl group (C20), behenyl group (C22), lignoceryl group (C24), cerotoyl group (C26), montanyl group (C28), melissyl group (C30), dotriacontanyl group (C32), tetratriacontanyl group (C34), and hexatriacontanyl group (C36).

In one embodiment, from the viewpoint of achieving a combination of reduced viscosity for the pigment dispersion and improved coating film durability and gloss for the printed matter, the amount of the structural unit derived from the monomer having an alkyl group of 8 to 36 carbon atoms contained within the pigment dispersing resin, relative to the total mass of all the structural units of the pigment dispersing resin (copolymer), is preferably within a range from 5% by mass to 60% by mass, more preferably from 10% by mass to 55% by mass, and particularly preferably from 20% by mass to 50% by mass.

In one embodiment, it is particularly desirable that an aromatic group is introduced into the pigment dispersing resin. An aromatic group can improve the adsorption capability to the pigment, and enable a rapid reduction in the pigment dispersibility upon mixing with the treatment liquid. This is because when the treatment liquid and the inkjet ink are mixed, powerful intermolecular forces called cation-$\pi$ interactions occur between the calcium ions contained in the treatment liquid and the pigment dispersing resin having the aromatic group, causing the two to undergo preferential adsorption. Examples of the aromatic group include a phenyl group, naphthyl group, anthryl group, tolyl group, xylyl group, mesityl group and anisyl group. Of these, a phenyl group or tolyl group is preferred in terms of ensuring satisfactory dispersion stability.

From the viewpoint of achieving a combination of good pigment dispersion stability and favorable adsorption performance with the treatment liquid, the amount of the structural unit derived from the monomer containing the aromatic group, relative to the total mass of all of the structural units of the pigment dispersing resin, is preferably within a range from 5 to 65% by mass, and more preferably from 10 to 50% by mass.

In one embodiment, the acid value of the pigment dispersing resin is preferably within a range from 20 to 300 mgKOH/g, and more preferably from 50 to 250 mgKOH/g.

Adjusting the acid value to a value within this range satisfactorily enhances the reduction effect on the dispersion function upon mixing with the calcium ions in the treatment liquid, enabling images of extremely high image quality to be obtained with ease. Further, the ink storage stability improves, meaning a dispersed state similar to that initially obtained can be maintained even after storage of the ink for long periods, and printed matter having aggregation and coverage properties similar to those initially obtained can be obtained. Furthermore, the ink jetting stability also improves.

The acid value can be measured by a potentiometric titration method using a conventional device, such as the automatic potentiometric titrator AT-610 manufactured by Kyoto Electronics Manufacturing Co., Ltd.

In one embodiment, the weight average molecular weight of the pigment dispersing resin is preferably at least 1,000 but not more than 100,000. When the weight average molecular weight falls within the above range, the pigment can be more easily dispersed stably in water, and the viscosity of the ink can be more easily adjusted. Further, when the weight average molecular weight is at least 1,000, detachment of the pigment dispersing resin adsorbed to the pigment or coating the pigment can be prevented, meaning the dispersion stability can be favorably maintained. Provided the weight average molecular weight is not more than 100,000, the viscosity upon dispersion can be kept within a favorable range, any deterioration in the jetting stability from the inkjet head is prevented, and an ink having favorable printing stability can be more easily obtained.

In one embodiment, the pigment dispersing resin is preferably a water-soluble pigment dispersing resin. The weight average molecular weight of this water-soluble pigment dispersing resin is more preferably at least 5,000 but not more than 50,000. When the molecular weight falls within this range, ink thickening occurs upon insolubilization by the calcium ions. As a result, even during high-speed printing, color mixing is suppressed, images of high image quality can be obtained, and the continuous jetting stability during high-speed printing can be favorably maintained.

In one embodiment, the above method (1) is selected as the method for stably dispersing the pigment in the ink and maintaining that dispersion. In other words, when a water-soluble pigment dispersing resin is used as the above pigment dispersing resin, in order to increase the solubility of the resin in the ink, the acid groups in the pigment dispersing resin are preferably neutralized with a base. On the other hand, if an excess of base is introduced to effect the neutralization, then the calcium ions contained in the treatment liquid are also neutralized, making it difficult to achieve satisfactory effects, and therefore considerable care must be taken with the amount added of the base.

Whether or not the amount added of the base is excessive can be confirmed, for example, by preparing a 10% by mass aqueous solution of the water-soluble pigment dispersing resin and then measuring the pH of the aqueous solution. In one embodiment, from the viewpoint of ensuring satisfactory manifestation of the functions of the treatment liquid, the pH of the above aqueous solution is preferably within a range from 7 to 11, and more preferably from 7.5 to 10.5.

In one embodiment, examples of bases that may be used for neutralizing the water-soluble pigment dispersing resin include alkanolamines such as diethanolamine, triethanolamine and N-methyldiethanolamine; ammonia water; alkali metal hydroxides such as lithium hydroxide, sodium hydroxide and potassium hydroxide; and alkali metal carbonates such as lithium carbonate, sodium carbonate, sodium hydrogen carbonate and potassium carbonate.

In those cases where the above method (1) is selected, the blend amount of the water-soluble pigment dispersing resin relative to the pigment is preferably within a range from 1 to 50% by mass. Ensuring that the blend amount of the water-soluble pigment dispersing resin is from 1 to 50% by mass relative to the pigment suppresses any viscosity increase of the pigment dispersion, can easily improve the viscosity stability and dispersion stability of the pigment dispersion and the inkjet ink, and ensures a rapid reduction in the dispersion function upon mixing with the treatment liquid. The blend amount (ratio) of the water-soluble pigment dispersing resin relative to the pigment is more preferably within a range from 2 to 45% by mass, even more preferably from 4 to 40% by mass, and most preferably from 5 to 35% by mass.

<Water-Soluble Organic Solvent>

In one embodiment, the inkjet ink contains water and a water-soluble organic solvent as the liquid components. The ink preferably includes a specified glycol ether-based organic solvent (A) described below as the water-soluble organic solvent.

(Specified Glycol Ether-Based Organic Solvent (A))

In one embodiment, the inkjet ink contains a specified glycol ether-based organic solvent (A) represented by general formula (1) shown below as a water-soluble organic solvent. As already described above, it is thought that an ink containing the specified glycol ether-based organic solvent (A) exhibits dramatically superior permeability, and can easily provide excellent coating film durability and drying properties and superior printed image quality regardless of the recording medium and the printing conditions.

$$R1\text{-}(\text{-O}\text{---}CH_2CH_2\text{-})n\text{-}OH \qquad \text{General formula (1):}$$

In general formula (1), R1 represents an alkyl group of 2 to 4 carbon atoms which may have a branched structure. Further, n represents 2 or 3.

In one embodiment, the above specified glycol ether-based organic solvent (A) is preferably a compound in which R1 in general formula (1) is an alkyl group having a branched structure and/or an alkyl group having 4 carbon atoms. In one embodiment, a compound in which R1 is an alkyl group having a branched structure and having 4 carbon atoms can be used particularly favorably.

Among the various possible compounds for the specified glycol ether-based organic solvent (A), compounds in which R1 in general formula (1) is an alkyl group having a branched structure and/or an alkyl group having 4 carbon atoms exhibit low surface tension values. As a result, when these types of compounds are used as the specified glycol ether-based organic solvent (A), the compound penetrates readily into the interior of the recording medium regardless of the type of recording medium being used, and printed matter having excellent coating film durability, drying properties and printed image quality can be more easily obtained.

In one embodiment, a specified glycol ether-based organic solvent (A) in which n in the above general formula (1) is 2 can be favorably selected. Provided the specified glycol ether-based organic solvent (A) has few hydrophilic ethylene oxide groups ($-O-CH_2CH_2-$), the compound can penetrate readily even into low-absorption substrates such as coated papers, art papers and cast papers, and printed matter having excellent coating film durability and drying properties can be obtained. Further, the viscosity of the ink can be kept low, and the jetting stability improves, both of which are desirable.

Specific examples of the specified glycol ether-based organic solvent (A) include diethylene glycol monoethyl ether, diethylene glycol mono-n-propyl ether, diethylene glycol monoisopropyl ether, diethylene glycol mono-n-butyl ether, diethylene glycol monoisobutyl ether, diethylene glycol mono-t-butyl ether, triethylene glycol monoethyl ether, triethylene glycol mono-n-propyl ether, triethylene glycol monoisopropyl ether, triethylene glycol mono-n-butyl ether, triethylene glycol monoisobutyl ether, and triethylene glycol mono-t-butyl ether. A single specified glycol ether-based organic solvent (A) may be used alone, or a combination of two or more compounds may be used.

Among the various compounds mentioned above, specified glycol ether-based organic solvents (A) in which R1 in general formula (1) is an alkyl group having a branched structure and/or an alkyl group of 4 carbon atoms, and/or specified glycol ether-based organic solvents (A) in which n in general formula (1) is 2 can be used favorably.

Specifically, at least one organic solvents selected from among diethylene glycol monoisopropyl ether, diethylene glycol mono-n-butyl ether, diethylene glycol monoisobutyl ether and diethylene glycol mono-t-butyl ether is preferably selected. Of these, diethylene glycol monoisobutyl ether and/or diethylene glycol mono-t-butyl ether, which satisfy all of the above preferred conditions are the most desirable.

In one embodiment, from the viewpoint of obtaining printed matter of high image quality while also ensuring favorable permeation into the interior of recording media and improving the coating film durability, the total blend amount of the specified glycol ether-based organic solvents (A) in the inkjet ink is preferably within a range from 2 to 35% by mass relative to the total mass of the inkjet ink. This blend amount is more preferably from 3 to 30% by mass, particularly preferably from 4 to 25% by mass, and most preferably from 5 to 20% by mass.

(Diol-Based Solvent (B) Having Surface Tension of 30 to 50 mN/m)

In one embodiment, in addition to the aforementioned specified glycol ether-based organic solvent (A), the inkjet ink preferably also contains a diol-based solvent (B) having a surface tension at 25° C. within a range from 30 to 50 mN/m (hereafter also referred to as "the diol-based solvent (B) of specified surface tension").

The above specified glycol ether-based organic solvent (A) has a low surface tension. As a result, when printing to recording media having particularly high absorption, or when the time interval between printing and drying is long, if only the organic solvent (A) is used, then there is a possibility that image defects such as feathering may not be able to be adequately suppressed. Accordingly, a combination of the above organic solvent (A) and the diol-based solvent (B) of specified surface tension is preferred used. By using a combination of these solvents, the surface tension of the microscopic ink droplets increases, and it is thought that hydrogen bonding is also formed with the ethylene oxide groups in the specified glycol ether-based organic solvent (A). As a result, printed matter of dramatically superior printed image quality can be obtained regardless of the recording medium or the printing conditions. Moreover, an improvement in jetting stability that is thought to be due to the hydrogen bonding mentioned above can also be achieved.

Specific examples of the diol-based solvent (B) of specified surface tension include, but are not limited to, ethylene glycol, 1,2-propanediol, 1,3-propanediol, 1,2-butanediol, 1,3-butanediol, 1,4-butanediol, 2,3-butanediol, 1,5-pentanediol, 1,6-hexanediol, 2-methyl-1,3-propanediol, 3-methyl-1,3-butanediol, 2,2-dimethyl-1,3-propanediol, diethylene glycol, triethylene glycol, and dipropylene glycol. One of these diol-based solvents (B) of specified surface tension may be used alone, or a combination of two or more such solvents may be used.

In those cases where an aforementioned diol-based solvent (B) of specified surface tension is used, the use of a compound having a boiling point at one atmosphere of 180 to 235° C. is preferred, use of a compound for which this boiling point is from 180 to 225° C. is more preferred, and a compound for which the boiling point is from 180 to 210° C. is particularly desirable.

When a diol-based solvent (B) of specified surface tension that has a boiling point within the above range is used, once aggregation and precipitation of the solid components in the ink and localized thickening of the ink has occurred, the solvent volatilizes rapidly, enabling printed matter having excellent printed image quality, coating film durability and drying properties to be obtained with ease. Among the diol-based solvents (B) of specified surface tension listed above, examples of compounds having a boiling point at one atmosphere within the range from 180 to 235° C. include ethylene glycol, 1,2-propanediol, 1,3-propanediol, 1,2-butanediol, 1,3-butanediol, 1,4-butanediol, 2,3-butanediol, 2-methyl-1,3-propanediol, 3-methyl-1,3-butanediol, 2,2-dimethyl-1,3-propanediol, and dipropylene glycol.

The above boiling point at one atmosphere can be measured using a thermal analyzer such as a DSC (differential scanning calorimeter).

Furthermore, selection of at least one water-soluble organic solvent selected from the group consisting of alkanediols having 3 or fewer carbon atoms, namely ethylene glycol, 1,2-propanediol and 1,3-propanediol, as the aforementioned diol-based solvent (B) of specified surface tension is also preferred. Alkanediols having 3 or fewer carbon atoms have a low boiling point at one atmosphere, but have a comparatively high surface tension of 35 to 50 mN/m. Accordingly, when combined with the specified glycol ether-based organic solvent (A), the improvement in the printed image quality is the most superior.

Moreover, selection of diethylene glycol and/or triethylene glycol as the diol-based solvent (B) of specified surface tension is also desirable. Diethylene glycol and triethylene glycol have one or more ethylene oxide groups in the molecular structure, and exhibit excellent affinity with the specified glycol ether-based organic solvent (A) which also has ethylene oxide groups. Accordingly, printed matter having superior coating film durability, drying properties and printed image quality can be obtained in a stable manner.

In one embodiment, when the ink contains the diol-based solvent (B) of specified surface tension, from the viewpoints of achieving favorable manifestation of the effects described above and obtaining printed matter of excellent printed image quality, the blend amount of diol-based solvent (B), relative to the total mass of the ink, is preferably within a range from 3 to 45% by mass, more preferably from 4 to 40% by mass, and particularly preferably from 5 to 35% by mass.

Further, as described above, the diol-based solvent (B) of specified surface tension is a material that improves the printed image quality of the printed matter and the jetting stability as a result of interaction with the specified glycol ether-based organic solvent (A). Accordingly, it is particularly desirable that the blend amount of the diol-based solvent (B) of specified surface tension is determined on the basis of the blend amount of the specified glycol ether-based organic solvent (A). As a result of intensive investigation, the inventors of the present invention discovered that if the blend amount of the specified glycol ether-based organic solvent (A) is deemed to be 1, then when a mass ratio is used in which the blend amount of the diol-based solvent (B) of specified surface tension is within a range from 0.5 to 7.5, an ink is obtained that yields excellent jetting stability and printed image quality of the printed matter. Furthermore, from the viewpoint of further enhancing these effects, if the blend amount of the specified glycol ether-based organic solvent (A) is deemed 1, then the blend amount of the diol-based solvent (B) of specified surface tension is more preferably within a range from 0.7 to 5, and particularly preferably from 1 to 3.

(Other Water-Soluble Organic Solvents)

In one embodiment, in addition to the specified glycol ether-based organic solvent (A) and the diol-based solvent (B) of specified surface tension, the inkjet ink may also contain a single other water-soluble organic solvent or a combination of a plurality of such other water-soluble organic solvents. However, the amount of these other water-soluble organic solvents is preferably adjusted so as not to impair the desired effects.

There are no particular limitations on these other water-soluble organic solvents, and specific examples include:

polyol-based solvents such as 1,2-pentanediol, 1,2-hexanediol, 4-methyl-1,2-pentanediol, 3,3-dimethyl-1,2-butanediol, and glycerol;

monohydric alcohols such as 2-propanol, 1-butanol, 2-butanol, 3-methoxy-1-butanol, and 3-methoxy-3-methyl-1-butanol;

propylene glycol monoether-based solvents such as propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, and tripropylene glycol monobutyl ether;

propylene glycol diether-based solvents such as propylene glycol dimethyl ether, dipropylene glycol dimethyl ether, and tripropylene glycol dimethyl ether;

ethylene glycol monoether-based solvents such as ethylene glycol monomethyl ether, ethylene glycol monoethyl ether, ethylene glycol monobutyl ether, ethylene glycol 2-ethylhexyl ether, diethylene glycol monomethyl ether, diethylene glycol monopentyl ether, diethylene glycol monohexyl ether, triethylene glycol monomethyl ether, and triethylene glycol monoethyl ether;

ethylene glycol diether-based solvents such as diethylene glycol methyl ethyl ether, diethylene glycol methyl butyl ether, triethylene glycol methyl ethyl ether, triethylene glycol methyl butyl ether, diethylene glycol diethyl ether, triethylene glycol diethyl ether, tetraethylene glycol dimethyl ether, tetraethylene glycol diethyl ether, tetraethylene glycol methyl ethyl ether, and tetraethylene glycol methyl butyl ether; and nitrogen-containing solvents such as 2-pyrrolidone, N-methyloxazolidinone, and ε-caprolactam. However, the other water-soluble organic solvents that may be used are not limited to those listed above. Further, one of these solvents may be used alone, or a mixture of a plurality of solvents may be used.

In one embodiment, from the viewpoints of achieving superior moisture retention, drying properties and wetting properties for the inkjet ink, the total amount of water-soluble organic solvent in the inkjet ink, relative to the total mass of the inkjet ink, is preferably at least 6% by mass but not more than 70% by mass, more preferably at least 10% by mass but not more than 60% by mass, and particularly preferably at least 15% by mass but not more than 50% by mass.

(Boiling Points of Water-Soluble Organic Solvents)

In one embodiment, the amount of water-soluble organic solvents having a boiling point at one atmosphere of at least 245° C. in the inkjet ink is preferably at least 0% by mass but less than 10% by mass relative to the total mass of the inkjet ink. By controlling the amount of such organic solvents within the above range, printed matter having excellent coating film durability and drying properties, with good suppression of blocking, can be obtained with ease, even during high-speed printing. Blocking describes a phenomenon in which, when printed matter is stacked or rolled, the back surface of the recording medium becomes marked with the ink.

Further, when the inkjet ink is combined with the treatment liquid of the embodiment described above, from the viewpoint of being able to obtain printed matter having excellent image quality even with high-speed printing, the amount of water-soluble organic solvent having a boiling point at one atmosphere of at least 245° C. is particularly preferably at least 0% by mass but less than 9% by mass relative to the total mass of the inkjet ink.

In the above description, the term "0% by mass" means that the inkjet ink does not contain any water-soluble organic solvents having a boiling point at one atmosphere of at least 240° C. Further, the amount of water-soluble organic solvents having a boiling point at one atmosphere of at least 240° C. is calculated so as to include the specified glycol ether-based organic solvent (A) and the diol-based solvent (B) of specified surface tension.

In one embodiment, the weighted average boiling point at one atmosphere of the water-soluble organic solvents contained in the inkjet ink is preferably within a range from 175 to 245° C., more preferably from 180 to 235° C., even more preferably from 185 to 220° C., and particularly preferably from 190 to 210° C. When the weighted average boiling point of the water-soluble organic solvents falls within this range, the combination with the treatment liquid of the embodiment described above enables images of high image quality to be obtained even during high-speed printing, and also enables superior jetting stability to be obtained. The weighted average boiling point is calculated including the specified glycol ether-based organic solvent (A) and the diol-based solvent (B) of specified surface tension. Further, the "weighted average boiling point at one atmosphere" is a value obtained by calculating, for each water-soluble organic solvent, a multiplication value of the boiling point at one atmosphere and the mass ratio of that organic solvent relative to the total mass of all of the water-soluble organic solvents, and then adding together the calculated multiplication values for the various water-soluble organic solvents.

<Binder Resin>

In one embodiment, the inkjet ink may also include a binder resin if necessary. Generally known binder resins include resin microparticles and water-soluble resins, and either one may be used alone, or a combination of both may be used.

The aforementioned resin microparticles can use a resin having a higher molecular weight than water-soluble resins, and can also lower the viscosity of the inkjet ink, meaning a larger amount of the resin can be added to the inkjet ink, which is ideal for dramatically enhancing the coating film durability of the printed matter.

Examples of resins that may be used for the resin microparticles include (meth)acrylic-based resins, styrene-(meth)acrylic-based resins, urethane-based resins, styrene-maleic acid-based resins, styrene-butadiene-based resins, vinyl chloride-based resins, vinyl chloride-vinyl acetate-based resins, ethylene-vinyl acetate-based resins, and polyolefin-based resins. If consideration is given to achieving favorable ink storage stability, good coating film durability for the printed matter, a broad range of selectable materials, favorable compatibility upon mixing with the calcium nitrate, and superior printed matter with no whitening, then one or more types of resin microparticles selected from the group consisting of (meth)acrylic-based resins, styrene-(meth)acrylic-based resins, urethane-based resins and polyolefin-based resins can be used particularly favorably.

When the binder resin contained in the inkjet ink is composed of resin microparticles, consideration must be given to the MFT of the resin microparticles. When resin microparticles having a low MFT are used, the variety of water-soluble organic solvent added to the inkjet ink can sometimes cause further reduction in the MFT of the resin microparticles, meaning fusion and aggregation of the resin microparticles may occur even at room temperature, and as a result, blockages of the inkjet head nozzles can sometimes occur. In order to avoid these problems, it is preferable that the MFT of the resin microparticles is set to 50° C. or higher by appropriate adjustment of the monomers that constitute the resin microparticles.

Furthermore, core-shell resin microparticles containing a core component composed of a resin having a low MFT and a shell component composed of a resin having a high MFT may also be used as the binder resin. Conventional methods such as interface polymerization methods, suspension polymerization methods, in-situ polymerization methods, phase inversion emulsification methods, coacervation methods and in-liquid drying methods may be selected as appropriate for the method used for producing the core-shell resin microparticles.

The above MFT can be measured, for example, using MFT Tester manufactured by Tester Sangyo Co., Ltd. Specifically, a 25% by mass aqueous solution of the resin microparticles is applied to a metal plate to which a temperature gradient can be applied located inside the MFT tester to form a wet film thickness of 300 μm. Next, a temperature gradient is applied to the metal plate, and by drying the previously formed coating film, a film of resin microparticles is formed. Subsequently, the temperature at the boundary between the region where whitening has occurred and a uniform film has not been not obtained and the region where a transparent resin film has formed is read and recorded as the MFT.

On the other hand, when a water-soluble resin is used as the binder resin, the type of fusion and aggregation of the resin microparticles observed with the above resin microparticles does not occur. Accordingly, in cases such as when the maintainability of the inkjet printer required improvement, selection of a water-soluble resin is preferred. In those cases where a water-soluble resin is selected, the weight average molecular weight of the water-soluble resin is preferably within a range from 3,000 to 50,000, more preferably within a range from 4,000 to 40,000, and particularly preferably within a range from 5,000 to 35,000. By ensuring that the weight average molecular weight is at least 3,000, favorable coating film durability can be achieved for the printed matter. On the other hand, by ensuring that the weight average molecular weight is not more than 50,000, an inkjet ink having superior jetting stability from the inkjet head and superior maintenance properties can be more easily obtained.

In those cases where a water-soluble resin is use as the binder resin, examples of the types of resins that can be used as the water-soluble resin include (meth)acrylic-based resins, styrene-(meth)acrylic-based resins, urethane-based resins, styrene-maleic acid-based resins, styrene-butadiene-based resins, vinyl alcohol-based resins, cellulose-based resins, and polyolefin-based resins. If consideration is given to achieving favorable ink storage stability, favorable compatibility with the aforementioned water-soluble organic solvent, a broad range of selectable materials, favorable compatibility upon mixing with the calcium nitrate, and superior printed matter with no whitening, then one or more types of resin microparticles selected from the group consisting of (meth)acrylic-based resins, styrene-(meth)acrylic-based resins and urethane-based resins can be used particularly favorably.

In one embodiment, in those cases where a binder resin is used in the inkjet ink, the amount of the binder resin, expressed as a solid fraction amount relative to the total mass of the inkjet ink, is preferably within a range from 1 to 20% by mass, more preferably within a range from 2 to 15% by mass, and particularly preferably within a range from 3 to 10% by mass.

<Surfactants>

(Acetylenediol-Based Surfactant)

In one embodiment, the inkjet ink may contain a surfactant. Conventional compounds may be used as desired as the surfactant, but among the various possibilities, inclusion of an acetylene-based surfactant is preferred. Acetylene-based surfactants orient at the interface in a very short period of time. Accordingly, even if the heat absorption that occurs upon dissociation of the calcium nitrate causes slight changes in the ink viscosity or surface tension, this has no effect on the speed of orientation at the ink droplet interface or the speed of permeation into the interior of the recording medium. Further, it is also thought that because rapid orientation at the ink droplet interface occurs, coalescence of the ink droplets can be suppressed, and printed matter of excellent printed image quality with no bleeding can be obtained.

In one embodiment, among the various acetylene-based surfactants, a compound having an HLB value measured by the Griffin method of not more than 3 is preferably selected. The HLB (Hydrophile-Lipophile Balance) value is a parameter that represents the hydrophilic and lipophilic properties of a material as a numerical value, wherein a smaller HLB value indicates higher lipophilicity. In other words, it is thought that a smaller HLB value indicates a faster orientation speed at the ink droplet interface, enabling printed matter of superior printed image quality to be obtained.

The HLB value calculated using the Griffin method is determined using the molecular weight of the target material in accordance with formula (3) shown below.

$$\text{HLB value} = 20 \times (\text{sum of the molecular weights of hydrophilic portions}) \div (\text{molecular weight of material}) \quad \text{Formula (3):}$$

In another embodiment, an acetylene-based surfactant represented by general formula (2) shown above may also be selected favorably. Acetylene-based surfactants represented by the above general formula (2) have one or more ethylene oxide groups, and are thought to therefore exhibit favorable compatibility with the specified glycol ether-based organic solvent (A) which also has ethylene oxide groups. As a result, uneven distribution of the acetylene-based surfactant within the ink is unlikely, and printed matter of superior image quality can be obtained in a stable manner.

A single acetylenediol-based surfactant may be used alone, or a combination of two or more acetylenediol-based surfactants may be used. In one embodiment, a combination of an acetylenediol-based surfactant having an HLB value measured by the Griffin method of not more than 3 and an acetylenediol-based surfactant represented by the above general formula (2) may be used. Further, the acetylenediol-based surfactant may use a compound synthesized using a conventional method, or may use one of the commercially available products mentioned above.

In one embodiment, in those cases where the inkjet ink contains an acetylene-based surfactant, from the viewpoint of obtaining printed matter having favorable printed image quality, the amount of the acetylene-based surfactant, relative to the total mass of the ink, is preferably within a range from 0.2 to 2.5% by mass, more preferably from 0.4 to 2.0% by mass, and particularly preferably from 0.5 to 1.5% by mass.

(Other Surfactants)

In one embodiment, the inkjet ink may also contain a surfactant other than an acetylene-based surfactant (hereafter simply referred to as the "other surfactant"), provided this other surfactant does not impair the aggregation performance of the treatment liquid containing calcium nitrate. A single other surfactant may be used alone, or a combination of two or more such other surfactants may be used. Further, this other surfactant may be used in combination with, or separately from, the acetylene-based surfactant.

From the viewpoints of ensuring optimal wetting properties and achieving favorable jetting stability, the use of a siloxane-based surfactant and/or fluorine-based surfactant as the other surfactant is preferred, and the use of a siloxane-based surfactant is particularly desirable.

In those cases where a siloxane-based surfactant is used as the other surfactant, from the viewpoint of improving the speed of orientation at the ink interface and improving the jetting stability, a polyether-modified siloxane-based surfactant that uses a polyether group as an organic group is preferably selected. Further, from the viewpoint of the speed of orientation at the ink interface, the HLB value of the polyether-modified siloxane-based surfactant, calculated in accordance with formula (3) above, is preferably within a range from 2 to 12, more preferably from 2.5 to 11, and particularly preferably from 3 to 10.

Further, the molecular weight of the surfactant is also important in terms of controlling the wettability during evaporation of the inkjet ink, and improving the quality of the printed matter such as the coating film durability and the solvent resistance. The molecular weight of the other surfactant, expressed as a weight average molecular weight, is preferably at least 1,000 but not more than 50,000, and more preferably at least 1,500 but not more than 40,000. When the molecular weight of the surfactant is at least 1,000, the control effect on the wettability of the recording medium is more easily enhanced. Further, when the molecular weight of the surfactant is not more than 50,000, an inkjet ink having excellent storage stability can be more easily obtained.

The other surfactant may be synthesized using conventional methods, or a commercially available product may be used. When a commercially available surfactant is used, siloxane-based surfactants may be selected from among the specific examples of surfactants described above for use in the treatment liquid. Further, specific examples of fluorine-based surfactants include Zonyl TBS, FSP, FSA, FSN-100, FSN, FSO-100, FSO, FS-300, Capstone FS-30 and FS-31 (manufactured by E. I. du Pont de Nemours and Company), and PF-151N and PF-154N (manufactured by Omnova Solutions Inc.).

In one embodiment, in those cases where the inkjet ink contains another surfactant, the amount added of that other surfactant, relative to the total mass of the ink, is preferably at least 0.01% by mass but not more than 3.0% by mass, and more preferably at least 0.05% by mass but not more than 2.5% by mass.

The surfactant used in the inkjet ink and the surfactant used in the treatment liquid may be the same or different. If mutually different surfactants are used, then as described above, the blend amounts are preferably determined with due care regarding the surface tensions of the surfactants.

<Water>

The inkjet ink of the embodiment described above contains water. The water included in the inkjet ink is preferably not a typical water containing various ions, and the use of an ion-exchanged water (deionized water) is preferred.

In one embodiment, the amount of water in the inkjet ink is preferably within a range from 20 to 90% by mass relative to the total mass of the ink.

<Other Components>

In one embodiment, in addition to the components described above, the inkjet ink may contain appropriate amounts of other additives such as pH adjusters, antifoaming agents, preservatives, infrared absorbers and ultraviolet absorbers in order to obtain an ink having certain desired physical property values. The blend amount of these additives is preferably at least 0.01% by mass but not more than 10% by mass relative to the total mass of the inkjet ink. For the pH adjuster, the materials mentioned above for use as the pH adjuster in the treatment liquid can be used favorably.

In one embodiment, it is preferable that the inkjet ink contains substantially no polymerizable monomers. Here, the expression "contains substantially no polymerizable monomers" means that no such monomers are added intentionally, but does not exclude the incorporation or generation of trace amounts of such monomers during production or storage of the inkjet ink. Specifically, the amount of polymerizable monomers relative to the total mass of the inkjet ink is preferably not more than 1% by mass, and even more preferably 0.5% by mass or less.

(Inkjet Ink Set)

In one embodiment, an inkjet ink of a single color may be used. In another embodiment, depending on the application, the inkjet inks may be used in the form of an inkjet ink set containing a combination of a plurality of colors. There are no particular limitations on the color combination, but full-color images can be obtained by using the three colors of cyan, yellow and magenta. Further, by also adding a black ink, the level of blackness can be improved, and the legibility of text and the like can be improved. Moreover, by also adding other colors such as orange and green, the color reproducibility can be improved. When printing is performed to recording media that is not white, including a white ink enables more distinct images to be obtained. In those cases where the inkjet inks include a magenta ink, as mentioned above, it is preferable that the magenta ink contains a quinacridone pigment and/or a solid solution pigment containing a quinacridone pigment as the magenta pigment.

<Method for Producing Inkjet Ink>

The inkjet ink is composed of the types of components described above, and can be produced, for example, using the processes described below. However, the method for producing the inkjet ink is not limited to the processes described below.

(1) Production of Pigment Dispersion (when a Pigment Dispersing Resin is Used)

In those cases where a pigment dispersing resin is used in the inkjet ink, a pigment dispersion is prepared prior to preparation of the ink. For example, when a water-soluble pigment dispersing resin is used as the pigment dispersing resin, the water-soluble pigment dispersing resin and water, and a water-soluble organic solvent if required, are mixed together and stirred to produce a water-soluble pigment dispersing resin mixed solution. The pigment is then added to this water-soluble pigment dispersing resin mixed solution, and following mixing and stirring (premixing), a dispersion treatment is performed using a dispersion device. Subsequently, a centrifugal separation, filtration, or adjustment of the solid fraction concentration may be performed as required to obtain a pigment dispersion.

Further, when producing a dispersion of a pigment that has been coated with a water-insoluble resin, the water-insoluble resin is first dissolved in an organic solvent such as methyl ethyl ketone, and the water-insoluble resin is then neutralized as required to produce a solution of the water-insoluble resin. The pigment and water are then added to this solution of the water-insoluble resin, and following mixing and stirring (premixing), a dispersion treatment is performed using a dispersion device. Subsequently, the above organic solvent is removed by distillation under reduced pressure, and a centrifugal separation, filtration or adjustment of the solid fraction concentration may then be performed as required to obtain a pigment dispersion.

The dispersion device used for the pigment dispersion treatment may be any typically used dispersion device. Examples include a ball mill, roll mill, sand mill, beads mill, nanomizer, paint shaker and microfluidizer.

Examples of methods for controlling the particle size distribution of the pigment contained in the pigment dispersion include increasing the amount of electric power imparted to the pigment dispersion during the dispersion treatment, altering the shape of the stirring member (agitator), and performing a centrifugal separation or filtration or the like after the dispersion treatment. Further, in those cases where a media dispersion device such as a ball mill or beads mill is used as the dispersion device, additional methods include reducing the size of the media, altering the material used for the media, and increasing the media filling ratio.

In those cases where a media dispersion device is used, in order to ensure that the pigment size falls within the preferred particle size range, the diameter of the media is preferably within a range from 0.1 to 3 mm. Further, examples of materials that can be used favorably as the grinding media include glass, zircon, zirconia and titania. A combination of two or more of the above methods may also be used to control the particle size distribution of the pigment.

(2) Preparation of Inkjet Ink

In those cases where a pigment dispersing resin is used in the inkjet ink, the ink can be obtained, for example, by adding the water-soluble organic solvent, the surfactant and water, and where necessary the binder resin and other additives described above, to the pigment dispersion produced in the manner described above, and then performing stirring and mixing.

In the ink preparation, if necessary, the mixture of the above components may be stirred and mixed while being heated at a temperature within a range from 40 to 100° C. However, when resin microparticles are used as the binder resin, the heating temperature is preferably not higher than the MFT of the resin microparticles.

(3) Removal of Coarse Particles

In one embodiment, coarse particles contained in the above mixture obtained during ink preparation are preferably removed using techniques such as filtration and centrifugal separation, thus obtaining the inkjet ink. Conventional methods may be used as appropriate for the filtration method. Further, there are no particular limitations on the filter pore size, provided coarse particles and dust can be removed. For example, the filter pore size is preferably within a range from 0.3 to 5 μm, and more preferably from 0.5 to 3 μm. Further, when filtration is performed, a single type of filter may be used alone, or a combination of a plurality of filter types may be used.

<Properties of Inkjet Ink>

In one embodiment, the viscosity of the inkjet ink at 25° C. is preferably adjusted to value within a range from 3 to 20 mPa·s. Provided the ink has a viscosity within this range, stable jetting characteristics can be obtained from heads having a typical frequency of 4 to 10 kHz through to heads having a high frequency of 10 to 70 kHz. In particular, by ensuring that the viscosity at 25° C. is within a range from 3 to 14 mPa·s, stable jetting can be achieved even when using an inkjet head having a design resolution of 600 dpi or higher.

The viscosity of the inkjet ink at 25° C. can be measured using normal methods. Specifically, the viscosity can be measured with an ε-type viscometer (TVE25L viscometer, manufactured by Toki Sangyo Co., Ltd.), and represents the value obtained by measuring the viscosity of 1 mL of the ink at 25° C.

In one embodiment, from the viewpoint of obtaining printed matter having excellent color development, the inkjet ink preferably contains a pigment having an average secondary particle size (D50) of 40 nm to 500 nm, more preferably 50 nm to 400 nm, and particularly preferably 60 nm to 300 nm. In order to ensure that the average secondary particle size of the pigment falls within the above preferred range, the pigment dispersion treatment process is preferably controlled in the manner described above. The average secondary particle size represents, for example, the median size measured by the dynamic light scattering method. Specifically, the average secondary particle size may be a value obtained by measuring the ink, which may be diluted with water as necessary, using a Nanotrac UPA-EX 150 manufactured by MicrotracBEL Corporation.

2. Method for Producing Printed Matter

One embodiment relates to a method for producing printed matter using an ink set containing the treatment liquid of an embodiment described above and the inkjet ink of an embodiment described above. The production method preferably includes a step of applying the treatment liquid of an embodiment described above to a recording medium formed from a paper substrate or a synthetic paper substrate, and a step of applying the inkjet ink of an embodiment described above by one-pass printing to a portion to which the treatment liquid has been applied.

"One-pass printing" is a printing method in which either the inkjet head is scanned only once across a stationary recording medium, or the recording medium is passed only once beneath a stationary inkjet head, meaning no ink is overprinted on top of previously printed ink. One-pass printing requires fewer scanning repetitions and enables increased printing speeds compared with conventional inkjet printing methods that require multiple scanning passes of the inkjet head (multi-pass printing methods). As a result, one-pass printing can be used favorably for industrial applications that require fast printing speeds. It could be said that use of this printing method is essential for realizing the type of inkjet printing that has recently been actively investigated as an alternative to offset printing and gravure printing.

The method for producing printed matter using an ink set of the embodiment described above is described below in further detail.

<Method for Applying Treatment Liquid>

In one embodiment, prior to printing of the inkjet ink, the treatment liquid is applied to a recording medium being transported at a speed of at least 40 m/min. The method for applying the treatment liquid to the recording medium may employ either a printing method that involves no contact with the recording medium such as inkjet printing, or a printing method that involves bringing the treatment liquid into contact with the recording medium.

In recent years, by employing a heater inside the head, and by optimizing the flow channels in the head and the nozzle structures, inkjet heads have been developed that are capable of jetting even liquid compositions having a viscosity at 25° C. of about 100 mPa·s. In one embodiment, the preferred range for the viscosity at 25° C. of the above treatment liquid is from 5 to 100 mPa·s, meaning the treatment liquid can be printed without any problems, even when inkjet printing is employed. In those cases where inkjet printing is employed as the method for applying the treatment liquid, from the viewpoint of retaining the inherent texture of the recording medium in the unprinted portions, the treatment liquid is preferably only applied to those portions to which the inkjet ink is to be applied.

On the other hand, from the viewpoints of preventing damage to the members that constitute the inkjet head, and ensuring favorable inkjet printability, a printing method in which the treatment liquid is brought into contact with the recording medium is preferably used. Any conventional method may be selected as the printing method for bringing the treatment liquid into contact with the recording medium. For example, from the viewpoints of apparatus simplicity, coating uniformity, operational efficiency, and economic viability and the like, a roller-type method is preferred employed. Here, a "roller-type method" means a printing method in which the treatment liquid is first applied to a rotating roller, and that treatment liquid is then transferred to the recording medium. Examples of roller-type coating devices that can be used favorably include offset gravure coaters, gravure coaters, doctor coaters, bar coaters, blade coaters, flexo coaters and roll coaters.

In one embodiment, the coating film thickness of the treatment liquid on the recording medium, expressed as a wet thickness, is preferably within a range from 0.5 to 10 μm, more preferably from 0.5 to 8.5 μm, and particularly preferably from 0.6 to 6 μm. When the coating film thickness is adjusted to a value within this range, the inherent texture of the recording medium is not impaired in those portions where the treatment liquid is applied but the inkjet ink is not applied, a satisfactory color mixing suppression effect can be achieved even during high-speed printing, and drying of the solvent components in the treatment liquid can be conducted satisfactorily. The coating film thickness of the treatment liquid is preferably determined with due consideration of the amount of inkjet ink applied and the amount of residual treatment liquid on the recording medium.

<Thermal Energy Application Following Treatment Liquid Application>

In one embodiment, following application of the treatment liquid to the recording medium, but prior to application of the inkjet ink, thermal energy is preferably applied to the recording medium to dry the treatment liquid on the recording medium. Further, it is particularly preferable that the treatment liquid is dried completely, namely that the liquid components in the treatment liquid are completely removed, before application of the inkjet ink. If the inkjet ink is applied before the treatment liquid has completely dried, then the reduction in the dissolution and/or dispersion action on the solid components in the inkjet ink can be better promoted. However, on the other hand, the amount of liquid components on the recording medium may become excessive, and if the amount of thermal energy applied following inkjet printing is insufficient, then there is a possibility that waviness of the recording medium or image defects such as bleeding may occur.

There are no particular limitations on the method used for applying the thermal energy. Examples of methods that may be used include heating drying methods, hot air drying methods, infrared drying methods, microwave drying methods and drum drying methods. The above drying methods may be used individually, or a plurality of methods may be combined. For example, by using a combination of a heating drying method and a hot air drying method, the treatment liquid can be dried more rapidly than when either of these methods is used alone.

From the viewpoints of preventing damage to the recording medium and preventing sudden boiling of the liquid components in the treatment liquid, in those cases where a heating drying method is employed, the drying temperature is preferably within a range from 35 to 100° C. Further, in those cases where a hot air drying method is employed, the temperature of the hot air is preferably from 50 to 250° C. Further, for similar reasons, in those cases where an infrared drying method is employed, at least 50% of the integrated value of the total output of infrared rays used in the infrared irradiation preferably exists in the wavelength region from at least 700 nm to not more than 1,500 nm.

<Treatment Liquid Application and Drying Device>

A device for implementing application and drying of the treatment liquid in the above production method is installed in either an in-line arrangement or an off-line arrangement relative to the inkjet printing apparatus described below. In terms of convenience during printing, installation of the device in an in-line arrangement is preferred.

<Method for Applying Inkjet Ink>

As described above, the inkjet ink is preferably applied to the recording medium using a one-pass printing method. As already mentioned above, there are two types of one-pass printing: a method in which the inkjet head is scanned only once across a stationary recording medium, and a method in which the recording medium is passed only once beneath a stationary inkjet head. In the case of the method in which the inkjet head is scanned, the jet timing must be adjusted in accordance with the movement of the inkjet head, and there is an increased likelihood of variation in the impact position. As a result, in one embodiment, a method in which the inkjet head is kept stationary and the recording medium is scanned can be used favorably. In this method, the transport speed of the recording medium is preferably at least 40 m/min. Particularly in those cases where the treatment liquid application device is installed in an in-line arrangement relative to the inkjet printing apparatus, it is preferable that the treatment liquid application device and the inkjet printing apparatus are disposed in a continuous arrangement, so that the recording medium to which the treatment liquid has been applied can be simply transported to the inkjet printing section.

Further, as already mentioned above, by using the ink set of the embodiment described above, images of high image quality can be produced even at high speed and even with a recording resolution of 600 dpi or higher. Of the various possibilities, from the viewpoint of providing printed matter having image quality similar to that achievable with offset printing or gravure printing, in one embodiment, it is particularly preferable that the recording resolution of the printed matter is 1,200 dpi or higher.

<Inkjet Head>

In those cases where a method in which the recording medium is passed only once beneath a stationary inkjet head is employed as the one-pass printing method, the recording resolution in the recording width direction is determined by the design resolution of the inkjet head. In a similar manner to that mentioned above, the recording resolution in the recording width direction is also preferably 600 dpi or higher. Accordingly, the design resolution of the inkjet head is also preferably 600 dpi or higher, and is particularly preferably 1,200 dpi or higher Provided the design resolution of the inkjet head is 600 dpi or higher, printing of one color can be performed with a single inkjet head, which is preferable from the viewpoint of reducing the size of the apparatus and from an economic viewpoint. On the other hand, in those cases where an inkjet head having a design resolution lower than 600 dpi is used, by aligning a plurality of inkjet heads along the transport direction for the recording medium for one color, a recording resolution of 600 dpi or higher in the recording width direction can still be achieved by one-pass printing.

Furthermore, the print resolution in the transport direction of the recording medium is dependent not only on the design resolution of the inkjet head, but also on the drive frequency of the inkjet head and the printing speed. For example, the recording resolution in the transport direction can be doubled by either reducing the printing speed by ½, or by doubling the drive frequency. In those cases where, as a result of the design of the inkjet head, a print resolution of 600 dpi or higher cannot be achieved in the transport direction when the printing speed is 40 m/min or higher, by aligning a plurality of inkjet heads along the transport direction for the recording medium for one color, a combination of the superior printing speed and print resolution can be achieved.

The drop volume for the inkjet ink in the inkjet one-pass printing method is significantly affected by the performance of the aforementioned inkjet head, but from the viewpoint of achieving high-quality images, the drop volume is preferably within a range from 1 to 30 pL. Furthermore, in order to obtain high-quality images, the use of an inkjet head with a graduated specification that enables the drop volume to be varied is particularly preferred.

<Thermal Energy Application following Inkjet Ink Application>

Following application of the inkjet ink to the recording medium to which the treatment liquid has already been applied, thermal energy is preferably applied to the recording medium to dry the inkjet ink and any undried treatment liquid. Examples of thermal energy application methods and conditions that can be used favorably include the same methods and conditions as those described above for the drying of the treatment liquid.

<Inkjet Ink Drying Device>

The inkjet ink drying device may be installed in an in-line arrangement or an off-line arrangement relative to the inkjet printing apparatus. In terms of convenience and the like during printing, the inkjet ink drying device is preferably installed in an in-line arrangement. In one embodiment, from the viewpoints of preventing bleeding, color irregularities, and curling and the like of the recording medium, the thermal energy is preferably applied within 30 seconds of printing the ink, more preferably within 20 seconds, and particularly preferably within 10 seconds.

<Amounts Applied of Treatment Liquid and Inkjet Ink>

In one embodiment, the ratio of the amount applied of the inkjet ink, relative to a value of 1 for the amount applied of the treatment liquid, is preferably at least 0.1 but not more than 10. This ratio of the amount applied of the ink is more preferably at least 0.5 but not more than 9, and particularly preferably at least 1 but not more than 8. By ensuring that the ratio of the amount applied of the ink falls within the above range, changes in the texture of the recording medium caused by excessive treatment liquid, and bleeding and color irregularities that can occur as a result of excessive inkjet ink and a deterioration in the effects of the treatment liquid can be suppressed, and high-quality printed matter can be obtained with ease.

<Printing Speed>

As mentioned above, in the method for producing printed matter using the ink set of the embodiment described above, the printing speed is preferably at least 40 m/min, more preferably at least 60 m/min, and particularly preferably 80 m/min or higher.

<Recording Medium>

In the method for producing printed matter described above, in order to achieve high-speed and high-image quality printing, the functions of the treatment liquid must be able to be satisfactorily realized. Consequently, the calcium nitrate in the treatment liquid must exist on the recording medium in an amount within a specific range. Accordingly, the state of formation of the treatment liquid layer on the recording medium during inkjet printing is important, meaning the porosity and permeability of the recording medium, which affect the formation of the treatment liquid layer, are important. When performing printing using the ink set of the embodiment described above, conventional recording media may be used as desired, but from the above viewpoints, a paper substrate or synthetic paper substrate is preferably selected as the recording medium.

The term "paper substrate" mentioned above means a recording medium obtained by subjecting a material containing pulp to a papermaking process. The papermaking process may involve single-layer papermaking or multi-layer papermaking. Further, the surface of the paper may have a coating layer. Specific examples of paper substrates include high-quality papers, recycled papers, finely coated papers, coated papers, art papers, cast papers, liner papers, manila cardboards, and coated cardboards. The aforementioned "synthetic paper substrates" are recording media that contain a synthetic resin as the main raw material, and are recording media that have similar printing process characteristics to paper substrates.

The ink set of the embodiment described above can also be used on a variety of other substrates besides the recording media described above, including various fabric substrates of cotton or silk or the like, and plastic substrates such as polyvinyl chloride sheets, PET films, polypropylene films and polyethylene films.

The recording medium may have a surface that is either smooth or uneven. Further, the substrate may be transparent, semi-transparent or opaque. Furthermore, a substrate obtained by bonding together two or more print media may also be used. Moreover, a releasable adhesive layer may be provided on the opposite side from the printing surface, or an adhesive layer or the like may be provided on the printed surface following printing. The recording medium may exist in a roll-type form or sheet-like form.

The concentration of calcium ions derived from the treatment liquid on the recording medium surface is preferably within a range from 0.5 to 5 mmol/m$^2$, and more preferably from 1 to 4 mmol/m$^2$. When the concentration of calcium ions falls within this range, the aggregation and coverage properties due to the calcium ions are favorable, and particularly superior coating film durability can be obtained with ease.

3. Printed Matter

One embodiment relates to printed matter obtained by performing printing to a recording medium using the ink set of the embodiment described above. The printed matter exhibits excellent coating film durability and drying properties, and has superior image quality with good suppression of image defects such as color mixing and inadequate coverage, regardless of the type of recording medium used, and regardless of the printing conditions such as the printing speed and recording resolution.

EXAMPLES

The present invention is described below in further detail using a series of examples and comparative examples. In the following description, unless particularly stated otherwise, "parts" and "%" mean "parts by mass" and "% by mass" respectively.

I. Preparation of Treatment Liquids (1) Preparation Example for PVA103 Varnish

The materials described below were mixed at room temperature for one hour under constant stirring, and the temperature was then raised to 90° C. and mixing was continued for a further one hour. Subsequently, the thus obtained mixture was cooled to room temperature to obtain a PVA103 varnish.

(Materials)

PVA103 (a polyvinyl alcohol manufactured by Kuraray Co., Ltd. (degree of saponification: 98 to 99% (fully saponified), degree of polymerization: 300)) 25 parts Ion-exchanged water 75 parts (2) Preparation Example for Treatment Liquid 1

A mixing container equipped with a stirrer was prepared, and the materials listed below were added sequentially to the container. The materials were mixed at room temperature for one hour under gentle stirring, and the temperature was then raised to 60° C. and mixing was continued for a further one hour. Subsequently, the thus obtained mixture was cooled to room temperature and filtered through a membrane filter having a pore size of 1 μm to obtain a treatment liquid 1.

(Materials)

| | |
|---|---|
| Calcium nitrate tetrahydrate (manufactured by Yoneyama Chemical Industry Co., Ltd.) | 9.8 parts |
| Triethanolamine (TEA) | 1 part |
| 35% hydrochloric acid (35% HCl) | 0.62 parts |
| PVA103 varnish | 20 parts |
| 2-propanol (iPrOH) | 4 parts |
| Dynol 607 (an acetylene-based surfactant manufactured by Air Products and Chemicals, Inc.) | 0.4 parts |
| PROXEL GXL (a preservative, a 1,2-benzisothiazol-3-one solution, manufactured by Arch Chemicals, Inc.) | 0.05 parts |
| Ion-exchanged water | 64.13 parts |

The viscosity of the obtained treatment liquid 1 at 25° C. was measured using an ε-type viscometer (TVE25L viscometer, manufactured by Toki Sangyo Co., Ltd.). Further, the pH of the treatment liquid 1 at 25° C. was measured using a desktop pH meter (F-72 manufactured by Horiba, Ltd.) and a standard ToupH electrode. These results are shown in Table 1.

(3) Preparation Examples for Treatment Liquids 2 to 41

With the exception of using the materials shown in Table 1, the same method as that described for the treatment liquid 1 was used to obtain treatment liquids 2 to 41. Further, the viscosity and pH of each treatment liquid was measured in the same manner as treatment liquid 1. The measurement results are shown in Table 1.

TABLE 1

| Blend amount (%) | | | Treatment liquid No. | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| Metal salt | | Ca(NO$_3$)$_2$·4H$_2$O | 9.8 | 10.8 | 20 | 25 | 28.5 | 29.8 | 20 | 20 | 20 | 20 | 20 |
| Compounds having 3 or more hydroxyl groups | | Glycerol | | | | | | | 8 | 10 | 15 | | |
| | | Trimethylol-propane | | | | | | | | | | | |
| | | SANNIX GP-250 | | | | | | | | | | 10 | |
| | | Glucose | | | | | | | | | | | 10 |
| pH adjuster | Base | TEA | 1 | 1 | 1 | 1 | 1 | 1 | 1 | 1 | 1 | 1 | 1 |
| | Acid | 35% HCl | 0.62 | 0.62 | 0.62 | 0.62 | 0.62 | 0.62 | 0.62 | 0.62 | 0.62 | 0.62 | 0.62 |
| | Other | CH$_3$COOH | | | | | | | | | | | |
| | | CH$_3$COONa | | | | | | | | | | | |
| Binder resin | | PVA103 | 20 | 20 | 20 | 20 | 20 | 20 | 20 | 20 | 20 | 20 | 20 |
| | | varnish (solid fraction: 25%) | | | | | | | | | | | |
| | | BYK190 (solid fraction: 40%) | | | | | | | | | | | |
| Organic solvent | Monohydric alcohol | iPrOH (boiling point: 82° C.) | 4 | 4 | 4 | 4 | 4 | 4 | | | | | |
| Surfactant | Acetylene | Dynol 607 | 0.4 | 0.4 | 0.4 | 0.4 | 0.4 | 0.4 | 0.4 | 0.4 | 0.4 | 0.4 | 0.4 |
| Preservative | | PROXEL GXL | 0.05 | 0.05 | 0.05 | 0.05 | 0.05 | 0.05 | 0.05 | 0.05 | 0.05 | 0.05 | 0.05 |
| Water | | | 64.13 | 63.13 | 53.93 | 48.93 | 45.43 | 44.13 | 49.93 | 47.93 | 42.93 | 47.93 | 47.93 |
| Total | | | 100 | 100 | 100 | 100 | 100 | 100 | 100 | 100 | 100 | 100 | 100 |
| Treatment liquid viscosity (mPa·s) | | | 8.0 | 8.2 | 8.5 | 8.7 | 8.8 | 9.0 | 18.0 | 24.0 | 40.0 | 26.0 | 25.0 |
| Treatment liquid pH | | | 6.6 | 6.5 | 6.2 | 6.0 | 5.8 | 5.5 | 6.2 | 6.2 | 6.1 | 6.1 | 6.1 |
| Calcium nitrate content (%) | | | 6.8 | 7.5 | 13.9 | 17.4 | 19.8 | 20.7 | 13.9 | 13.9 | 13.9 | 13.9 | 13.9 |
| Amount of organic solvent having boiling point of 240° C. or higher (%) | | | 0.0 | 0.0 | 0.0 | 0.0 | 0.0 | 0.0 | 0.0 | 0.0 | 0.0 | 0.0 | 0.0 |

| Blend amount (%) | | | Treatment liquid No. | | | | | | | | | |
|---|---|---|---|---|---|---|---|---|---|---|---|---|
| | | | 12 | 13 | 14 | 15 | 16 | 17 | 18 | 19 | 20 |
| Metal salt | | Ca(NO$_3$)$_2$·4H$_2$O | 20 | 20 | 20 | 20 | 20 | 20 | 20 | 20 | 20 |
| Compounds having 3 or more hydroxyl groups | | Glycerol | | | | | | | | | |
| | | Trimethylol-propane | | | | | | | | | |
| | | SANNIX GP-250 | | | | | | | | | |
| | | Glucose | 10 | | | | | | | | |
| pH adjuster | Base | TEA | 1 | 0.4 | 1 | 0.8 | 2 | 1 | 1 | 1 | 1 |
| | Acid | 35% HCl | 0.62 | | 0.25 | | | 0.62 | 0.62 | 0.62 | 0.62 |
| | Other | CH$_3$COOH | | | | | | | | | |
| | | CH$_3$COONa | | | | | | | | | |
| Binder resin | | PVA103 | 20 | 20 | 20 | 20 | 20 | 20 | 20 | 20 | 20 |
| | | varnish (solid fraction: 25%) | | | | | | | | | |

TABLE 1-continued

| | | 21 | 22 | 23 | 24 | 25 | 26 | 27 | 28 | 29 | 30 |
|---|---|---|---|---|---|---|---|---|---|---|---|
| | BYK190 (solid fraction: 40%) | | | | | | | | | | 30 |
| Organic solvent | Monohydric alcohol | | | | 4 | 4 | 4 | 4 | 1 | 20 | |
| Surfactant | Acetylene Dynol 607 | 0.4 | 0.4 | 0.4 | 0.4 | 0.4 | 0.4 | 0.4 | 0.4 | 0.4 | 0.4 |
| | PROXEL GXL | 0.05 | 0.05 | 0.05 | 0.05 | 0.05 | 0.05 | 0.05 | 0.05 | 0.05 | 0.05 |
| | Water | 47.93 | 37.95 | 43.05 | 55.15 | 54.3 | 54.75 | 53.55 | 56.93 | 37.93 | 27.93 |
| | Total | 100 | 100 | 100 | 100 | 100 | 100 | 100 | 100 | 100 | 100 |
| | Treatment liquid viscosity (mPa·s) | 32.0 | 14.0 | 18.0 | 8.0 | 8.2 | 8.3 | 9.0 | 8.5 | 8.5 | 8.5 |
| | Treatment liquid pH | 6.1 | 6.6 | 7.4 | 2.2 | 3.6 | 7.8 | 10.8 | 6.1 | 6.1 | 6.1 |
| | Calcium nitrate content (%) | 13.9 | | 13.9 | 13.9 | 13.9 | 13.9 | 13.9 | 13.9 | 13.9 | 13.9 |
| | Amount of organic solvent having boiling point of 240°C or higher (%) | 0.0 | | 0.0 | 0.0 | 0.0 | 0.0 | 0.0 | 0.0 | 0.0 | 0.0 |

Treatment liquid No.

| Category | Component | 21 | 22 | 23 | 24 | 25 | 26 | 27 | 28 | 29 | 30 | 31 |
|---|---|---|---|---|---|---|---|---|---|---|---|---|
| Metal salt | Ca(NO$_3$)$_2$·4H$_2$O | 20 | 20 | 20 | 20 | 20 | 20 | 20 | 20 | 20 | 20 | 20 |
| | CaCl$_2$·2H$_2$O | | | | | | | | | | | |
| | NaCl | | | | | | | | | | | |
| Compounds having 3 or more hydroxyl groups | Glycerol | | | | | | | | | | | |
| pH adjuster | Base: TEA | 1 | 1 | 1 | 1 | 1 | 1 | 1 | 1 | 1 | 1 | 1 |
| | Acid: 35% HCl | 0.62 | 0.6 | 0.5 | 0.4 | 0.62 | 0.62 | 0.62 | 0.62 | 0.62 | 0.62 | 0.62 |
| Binder resin | PVA103 | 20 | 20 | 20 | 20 | | | | | | | |
| | varnish (solid fraction: 25%) | | | | | | | | | | | |
| | BYK190 (solid fraction: 40%) | | | | | 4 | 4 | 4 | 4 | 4 | 4 | 4 |
| Organic solvent | Monohydric alcohol: iPrOH (boiling point: 82°C) | | | | | | | | 20 | | | |
| | MB (boiling point: 158°C) | | 20 | | | | | | | | | |
| | Glycol: 1,2-PD (boiling point: 188°C) | | | 15 | | 10 | | 10 | | | | |
| | 1,2-HexD (boiling point: 224°C) | | | | 8 | | | 10 | | | | |
| | DEG (boiling point: 244°C) | | | | | | 15 | | 35 | | | |
| Surfactant | Acetylene: Dynol 607 | 0.4 | 0.4 | 0.4 | 0.4 | 0.4 | 0.4 | 0.4 | 0.4 | | | |
| | Surfynol 440 | | | | | | | | | 0.4 | | |
| | Surfynol 104E | | | | | | | | | | 0.4 | |
| | Siloxane: BYK348 | | | | | | | | | | | 0.4 |
| Preservative | PROXEL GXL | 0.05 | 0.05 | 0.05 | 0.05 | 0.05 | 0.05 | 0.05 | 0.05 | 0.05 | 0.05 | 0.05 |
| | Water | 37.93 | 37.95 | 43.05 | 50.15 | 47.93 | 42.93 | 33.93 | 20.55 | 53.93 | 53.93 | 53.93 |
| | Total | 100 | 100 | 100 | 100 | 100 | 100 | 100 | 100 | 100 | 100 | 100 |
| | Treatment liquid viscosity (mPa·s) | 8.6 | 14.0 | 18.0 | 15.0 | 18.0 | 21.2 | 17.0 | 17.0 | 8.5 | 8.5 | 8.5 |
| | Treatment liquid pH | 6.1 | 6.6 | 7.4 | 7.9 | 6.2 | 5.9 | 6.2 | 5.0 | 6.2 | 6.2 | 6.2 |

TABLE 1-continued

| | | | Treatment liquid No. | | | | | | | | | |
|---|---|---|---|---|---|---|---|---|---|---|---|---|
| | | | 32 | 33 | 34 | 35 | 36 | 37 | 38 | 39 | 40 | 41 |
| Calcium nitrate content (%) | | | 13.9 | 13.9 | 13.9 | 13.9 | 13.9 | 13.9 | 13.9 | 13.9 | 13.9 | 13.9 |
| Amount of organic solvent having boiling point of 240° C. or higher (%) | | | 0.0 | 0.0 | 8.0 | 10.0 | 15.0 | 0.0 | 0.0 | 0.0 | 0.0 | 0.0 |
| Blend amount (%) | Metal salt | $Ca(NO_3)_2 \cdot 4H_2O$ | 20 | 20 | 20 | 20 | | | 7.8 | 31.8 | 20 | 20 |
| | | $CaCl_2 \cdot 2H_2O$ | | | | | 15 | 20 | | | | |
| | | NaCl | | | | | | | | | 17.5 | 25 |
| | Compounds having 3 or more hydroxyl groups | Glycerol | | | | | | | | | | |
| | pH adjuster | Base TEA | 1 | | 1 | 1 | 1 | 1 | 1 | 1 | 1 | 1 |
| | | Acid 35% HCl | 0.62 | 0.62 | 0.62 | 0.62 | 0.62 | 0.62 | 0.62 | 0.62 | 0.62 | 0.62 |
| | Binder resin | PVA103 varnish (solid fraction: 25%) | | 12.5 | 64 | 76 | 20 | 20 | 20 | 20 | 20 | 10 |
| | | BYK190 (solid fraction: 40%) | 10 | | | | | | | | | |
| | Organic solvent | Monohydric alcohol iPrOH (boiling point: 82° C.) | | | | | | | | | | |
| | | Glycol MB (boiling point: 158° C.) | | | | | 4 | 4 | 4 | 4 | | |
| | | 1,2-PD (boiling point: 188° C.) | | | | | | | | | | |
| | | 1,2-HexD (boiling point: 224° C.) | | | | | | | | | | |
| | | DEG (boiling point: 244° C.) | | | | | | | | | | |
| | Surfactant | Acetylene Dynol 607 | 0.4 | 0.4 | 0.4 | 0.4 | 0.4 | 0.4 | 0.4 | 0.4 | 0.4 | 0.4 |
| | | Surfynol 440 | | | | | | | | | | |
| | | Surfynol 104E | | | | | | | | | | |
| | | Siloxane BYK348 | | | | | | | | | | |
| | Preservative | PROXEL GXL | 0.05 | 0.05 | 0.05 | 0.05 | 0.05 | 0.05 | 0.05 | 0.05 | 0.05 | 0.05 |
| | Water | | 67.93 | 65.43 | 13.93 | 1.93 | 58.93 | 53.93 | 66.13 | 42.13 | 40.43 | 42.93 |
| Total | | | 100 | 100 | 100 | 100 | 100 | 100 | 100 | 100 | 100 | 100 |
| Treatment liquid viscosity (mPa · s) | | | 4.5 | 5.0 | 100.0 | 120.0 | 8.0 | 8.5 | 8.0 | 9.0 | 43.0 | 50.0 |
| Treatment liquid pH | | | 6.0 | 6.0 | 5.5 | 5.6 | 6.5 | 6.2 | 6.6 | 5.5 | 6.1 | 6.1 |
| Calcium nitrate content (%) | | | 13.9 | 13.9 | 13.9 | 13.9 | 0.0 | 0.0 | 5.4 | 22.1 | 13.9 | 13.9 |
| Amount of organic solvent having boiling point of 240° C. or higher (%) | | | 0.0 | 0.0 | 0.0 | 0.0 | 0.0 | 0.0 | 0.0 | 0.0 | 0.0 | 0.0 |

Details regarding the abbreviations and product names for the materials shown in Table 1 are as follows.

<1> Metal Salts
   $Ca(NO_3)_2 \cdot 4H_2O$: calcium nitrate tetrahydrate
   $CaCl_2 \cdot 2H_2O$: calcium chloride dihydrate
   NaCl: sodium chloride
<2> Compounds Having Three or More Hydroxyl Groups
   SANNIX GP-250: a propylene oxide adduct of glycerol, manufactured by Sanyo Chemical Industries, Ltd., number average molecular weight: 250
<3> pH Adjusters
   TEA: triethanolamine
   35% HCl: 35% hydrochloric acid
<4> Binder Resins
   PVA103 varnish: as described above
   BYK190: an aqueous solution of a styrene-maleic acid resin (solid fraction: 40%) manufactured by BYK-Chemie Japan K.K.
<5> Organic solvents
   iPrOH: 2-propanol (boiling point: 82° C., surface tension: 20.9 mN/m)
   MB: 3-methoxy-1-butanol (boiling point: 158° C., surface tension: 29.3 mN/m)
   1,2-PD: 1,2-propanediol (boiling point: 188° C., surface tension: 35.1 mN/m)
   1,2-HexD: 1,2-hexanediol (boiling point: 224° C., surface tension: 25.9 mN/m)
   DEG: diethylene glycol (boiling point: 244° C., surface tension: 44.2 mN/m)
<6> Surfactants
   Dynol 607: an acetylene-based surfactant manufactured by Air Products and Chemicals, Inc. (Griffin method HLB value=8)
   Surfynol 440: an acetylene-based surfactant manufactured by Air Products and Chemicals, Inc. (Griffin method HLB value=8)
   Surfynol 104E: an acetylene-based surfactant manufactured by Air Products and Chemicals, Inc. (Griffin method HLB value=3)
   BYK348: a siloxane-based surfactant manufactured by BYK-Chemie Japan K.K. (Griffin method HLB value=10)
<7> Additive (Preservative)
   PROXEL GXL: a 1,2-benzisothiazol-3-one solution, manufactured by Arch Chemicals, Inc.

II. Preparation of Inkjet Inks (1) Pigment Dispersing Resin
<Production Example for Aqueous Solution of Pigment Dispersing Resin 1>

A reaction container fitted with a gas inlet tube, a thermometer, a condenser and a stirrer was charged with 93.4 parts of butanol, and the container was flushed with nitrogen gas. Subsequently, the contents of the reaction container were heated to 110° C., and a mixture containing 20 parts of styrene, 40 parts of acrylic acid and 40 parts of behenyl acrylate as polymerizable monomers and 6 parts of a polymerization initiator V-601 (manufactured by Wako Pure Chemical Industries, Ltd.) was added dropwise to the container over a period of two hours to achieve a polymerization reaction. Following completion of the dropwise addition, reaction was continued at 110° C. for a further three hours, an additional 0.6 parts of V-601 (manufactured by Wako Pure Chemical Industries, Ltd.) was added, and the reaction was continued at 110° C. for a further one hour, yielding a solution of a pigment dispersing resin (water-soluble pigment dispersing resin) 1.

Following cooling of the solution of the pigment dispersing resin 1 to room temperature, 37.1 parts of dimethylaminoethanol was added to neutralize the solution, and 100 parts of water was then added to generate an aqueous solution of the dispersing resin 1. Subsequently, the aqueous solution was heated to at least 100° C., and the butanol was removed by azeotropic distillation with the water to adjust the solid fraction to 30%. In this manner, an aqueous solution of the pigment dispersing resin 1 with a solid fraction of 30% was obtained. The above term "aqueous solution" describes a solution containing an aqueous medium, and components dispersed and/or dissolved in the aqueous medium.

Measurement of the pH of the aqueous solution (solid fraction: 30%) of the above pigment dispersing resin 1 using a desktop pH meter F-72 manufactured by Horiba, Ltd. revealed a pH of 9.7. Further, the acid value of the pigment dispersing resin 1 measured using an HLC-8120GPC device manufactured by Tosoh Corporation in accordance with method described above was 250 mgKOH/g, and the weight average molecular weight was 22,500.

<Production Examples for Aqueous Solutions of Pigment Dispersing Resins 2 to 7>

With the exceptions of altering the types and blend amounts of the polymerizable monomers and the amount of the polymerization initiator as shown below in Table 2, aqueous solutions (solid fraction: 30%) of pigment dispersing resins (water-soluble pigment dispersing resins) 2 to 7 were obtained in the same manner as the pigment dispersing resin 1.

TABLE 2

| | | Pigment dispersing resin | | | | | | |
|---|---|---|---|---|---|---|---|---|
| | | 1 | 2 | 3 | 4 | 5 | 6 | 7 |
| Polymerizable monomers | Styrene | 20 | 20 | 30 | 35 | 45 | 20 | 20 |
| | Acrylic acid | 40 | 30 | 16 | 6 | 1 | 50 | 30 |
| | Lauryl methacrylate | | 50 | 44 | 59 | 54 | 30 | 50 |
| | Behenyl acrylate | 40 | | | | | | |
| Polymerization initiator | V-601 | 6 | 6 | 6 | 6 | 6 | 6 | 12 |
| Aqueous solution pH | | 9.7 | 8.1 | 8.5 | 8.8 | 9.2 | 7.4 | 8.1 |
| Acid value (mgKOH/g) | | 250 | 200 | 110 | 40 | 15 | 350 | 200 |
| Weight average molecular weight | | 22,500 | 15,000 | 13,000 | 11,000 | 15,000 | 28,000 | 8,000 |

Table 2 shows the pH of the aqueous solution (solid fraction: 30%) of each pigment dispersing resin, the acid value of each pigment dispersing resin, and the weight average molecular weight of each pigment dispersing resin.

<Production Example for Pigment Dispersing Resin 8>

A reaction container fitted with a gas inlet tube, a thermometer, a condenser and a stirrer was charged with 45 parts of methyl ethyl ketone; 6.0 parts of acrylic acid, 30.0 parts of methyl methacrylate and 14.0 parts of lauryl methacrylate as polymerizable monomers; 0.15 parts of 2,2'-azobisisobutyronitrile as a polymerization initiator; and 0.65 parts of 2-(dodecylthiocarbonothioylthio)-isobutyric acid. Following flushing of the inside of the reaction container with nitrogen gas, the temperature was raised to 75° C., and a polymerization reaction was conducted for three hours, thus obtaining a copolymer (hydrophilic block) formed from acrylic acid, methyl methacrylate and lauryl methacrylate.

The mixed solution in the reaction container prior to the flushing with nitrogen gas and the mixed solution obtained following the polymerization reaction were analyzed using a gas chromatography-mass spectrometer and compared with the detection peaks attributable to the acrylic acid, methyl methacrylate and lauryl methacrylate used as raw materials. The results revealed that in the mixed solution obtained following the polymerization reaction, almost no peaks attributable to acrylic acid, methyl methacrylate or lauryl methacrylate were observed. Based on these results, it is thought that almost all of the added polymerizable monomers polymerized. Further, the weight average molecular weight of the hydrophilic block measured using an HLC-8120GPC device manufactured by Tosoh Corporation was about 23,000.

Following completion of the above polymerization reaction, the reaction system was cooled to normal temperature, and 45 parts of methyl ethyl ketone; and 10 parts of methyl methacrylate and 40 parts of benzyl methacrylate as polymerizable monomers were added to the reaction container. Following flushing of the inside of the reaction container with nitrogen gas, the temperature was raised to 75° C., and a polymerization reaction was conducted for three hours, thus obtaining a pigment dispersing resin (a water-insoluble resin) 8 composed of a block polymer having a copolymer (hydrophobic block) formed from methyl methacrylate and benzyl methacrylate added to the above hydrophilic block.

In the same manner as described above for the hydrophilic block, a comparison with the detection peaks attributable to the polymerizable monomers was performed using a gas chromatography-mass spectrometer. The results revealed that almost all of the added methyl methacrylate and benzyl methacrylate had polymerized, confirming formation of the hydrophobic block. Further, the weight average molecular weight of the pigment dispersing resin 8 measured using an HLC-8120GPC device manufactured by Tosoh Corporation was about 54,000. Furthermore, the acid value of the pigment dispersing resin 8 measured using an HLC-8120GPC device manufactured by Tosoh Corporation in accordance with method described above was 45 mgKOH/g.

Subsequently, the reaction system was cooled to normal temperature, the mixed solution was then removed from the reaction container, and methyl ethyl ketone was used to adjust the solid fraction to 40.3%, thus obtaining a methyl ethyl ketone solution of the pigment dispersing resin 8.

<Production Example for Pigment Dispersing Resin 9>

With the exception of using 12.0 parts of methacrylic acid and 12.0 parts of methyl methacrylate as polymerizable monomers; 0.2 parts of 2,2'-azobisisobutyronitrile as a polymerization initiator; and 0.85 parts of 2-(dodecylthiocarbonothioylthio)-isobutyric acid, a copolymer (hydrophilic block B) formed from methacrylic acid and methyl methacrylate was obtained in the same manner as the hydrophilic block of the pigment dispersing resin 8.

In the same manner as that described for the hydrophilic block of the pigment dispersing resin 8, the mixed solution in the reaction container prior to the flushing with nitrogen gas and the mixed solution obtained following the polymerization reaction were analyzed and compared using a gas chromatography-mass spectrometer. The results revealed that almost all of the added polymerizable monomers had polymerized. Further, the weight average molecular weight of the hydrophilic block B measured using an HLC-8120GPC device manufactured by Tosoh Corporation was about 12,000.

Furthermore, with the exceptions of using the reaction system containing the hydrophilic block B, and using 56 parts of methyl methacrylate, 10 parts of 2-ethylhexyl methacrylate and 10 parts of styrene as polymerizable monomers, a polymerization reaction was conducted in the same manner as that described for the pigment dispersing resin 8. As a result, a pigment dispersing resin (a water-insoluble resin) 9 composed of a block polymer having a copolymer (hydrophobic block B) formed from methyl methacrylate, 2-ethylhexyl methacrylate and styrene added to the above hydrophilic block B was obtained.

In the same manner as described above for the hydrophilic block, a comparison with the detection peaks attributable to the polymerizable monomers was performed using a gas chromatography-mass spectrometer. The results revealed that almost all of the added methyl methacrylate, 2-ethylhexyl methacrylate and styrene had polymerized, confirming formation of the hydrophobic block B. Further, the weight average molecular weight of the pigment dispersing resin 9 measured using an HLC-8120GPC device manufactured by Tosoh Corporation was about 41,000. Furthermore, the acid value of the pigment dispersing resin 9 measured using an HLC-8120GPC device manufactured by Tosoh Corporation in accordance with method described above was 92 mgKOH/g.

Subsequently, the reaction system was cooled to normal temperature, the mixed solution was then removed from the reaction container, and methyl ethyl ketone was used to adjust the solid fraction to 40.3%, thus obtaining a methyl ethyl ketone solution of the pigment dispersing resin 9.

(2) Pigment Dispersions

<Preparation Examples for Cyan Pigment Dispersions 1 to 7>

Twenty parts of LIONOL BLUE 7358G (C.I. Pigment Blue 15:3) manufactured by Toyo Color Co., Ltd., 20 parts of the aqueous solution (solid fraction concentration: 30%) of the pigment dispersing resin 1 and 60 parts of water were mixed together and preliminary dispersed using a stirrer. Subsequently, the mixture was subjected to a main dispersion for two hours using a Dyno-Mill with a capacity of 0.6 L filled with 1,800 g of zirconia beads of diameter 0.5 mm, thus obtaining a cyan pigment dispersion 1. Further, with the exception of replacing the pigment dispersing resin 1 with each of the pigment dispersing resins 2 to 7, cyan pigment dispersions 2 to 7 were obtained in the same manner as the above cyan pigment dispersion 1.

<Preparation Examples for Magenta Pigment Dispersions 1 to 7>

With the exception of changing the pigment used to FASTGEN SUPER MAGENTA RG (C.I. Pigment Red 122) manufactured by DIC Corporation, magenta pigment dispersions 1 to 7 were obtained in the same manner as the preparation examples for the above cyan pigment dispersions 1 to 7.

<Preparation Examples for Yellow Pigment Dispersions 1 to 7>

With the exception of changing the pigment used to FAST YELLOW 7413 (C.I. Pigment Yellow 74) manufactured by Sanyo Color Works, Ltd., yellow pigment dispersions 1 to 7 were obtained in the same manner as the preparation examples for the above cyan pigment dispersions 1 to 7.

<Preparation Examples for Black Pigment Dispersions 1 to 7>

With the exception of changing the pigment used to PrinteX 85 (carbon black) manufactured by Orion Engineered Carbons S.A., black pigment dispersions 1 to 7 were obtained in the same manner as the preparation examples for the above cyan pigment dispersions 1 to 7.

<Preparation Examples for Cyan Pigment Dispersions 8 and 9>

A mixing container fitted with a stirrer was charged with 14.9 parts of the methyl ethyl ketone solution (solid fraction concentration: 40.3%) of the pigment dispersing resin 8 and 14 parts of methyl ethyl ketone, 50 parts of water and 0.45 parts of dimethylaminoethanol were then added under stirring, and the resulting mixture was stirred for a further 30 minutes. Subsequently, 20 parts of LIONOL BLUE 7358G (C.I. Pigment Blue 15:3) manufactured by Toyo Color Co., Ltd. was added as a pigment, and following thorough mixing (preliminary dispersion), a main dispersion was conducted for two hours using a Dyno-Mill with a capacity of 0.6 L filled with 1,800 g of zirconia beads of diameter 0.5 mm. The resulting dispersion was extracted, and following the addition of 15 parts of water, an evaporator was used to remove the methyl ethyl ketone by distillation under reduced pressure. The solid fraction concentration was then adjusted to 20% to obtain a cyan pigment dispersion 8.

Furthermore, with the exceptions of replacing the methyl ethyl ketone solution of the pigment dispersing resin 8 with the methyl ethyl ketone solution of the pigment dispersing resin 9, and altering the amount added of the dimethylaminoethanol to 0.9 parts, a cyan pigment dispersion 9 was obtained in the same manner as the above preparation example for the cyan pigment dispersion 8.

<Preparation Examples for Magenta Pigment Dispersions 8 and 9>

With the exception of changing the pigment used to FASTGEN SUPER MAGENTA RG (C.I. Pigment Red 122) manufactured by DIC Corporation, magenta pigment dispersions 8 and 9 were obtained in the same manner as the above preparation examples for the cyan pigment dispersions 8 and 9.

<Preparation Examples for Yellow Pigment Dispersions 8 and 9>

With the exception of changing the pigment used to FAST YELLOW 7413 (C.I. Pigment Yellow 74) manufactured by Sanyo Color Works, Ltd., yellow pigment dispersions 8 and 9 were obtained in the same manner as the above preparation examples for the cyan pigment dispersions 8 and 9.

<Preparation Examples for Black Pigment Dispersions 8 and 9>

With the exception of changing the pigment used to PrinteX 85 (carbon black) manufactured by Orion Engineered Carbons S.A., black pigment dispersions 8 and 9 were obtained in the same manner as the above preparation examples for the cyan pigment dispersions 8 and 9.

<Preparation Example for Cyan Pigment Dispersion 10>

Twenty parts of LIONOL BLUE 7358G (C.I. Pigment Blue 15:3) manufactured by Toyo Color Co., Ltd., 24 parts of Plascoat Z-730 (a carboxyl group-containing polyester resin manufactured by GOO Chemical Co., Ltd., weight average molecular weight: 3,000, acid value: 50 mgKOH/g, solid fraction concentration: 25%) and 56 parts of water were mixed together and preliminary dispersed using a stirrer. Subsequently, the mixture was subjected to a main dispersion for two hours using a Dyno-Mill with a capacity of 0.6 L filled with 1,800 g of zirconia beads of diameter 0.5 mm, thus obtaining a cyan pigment dispersion 10.

<Preparation Examples for Magenta Pigment Dispersion 10, Yellow Pigment Dispersion 10, and Black Pigment Dispersion 10>

With the exception of changing the pigment used to FASTGEN SUPER MAGENTA RG (C.I. Pigment Red 122) manufactured by DIC Corporation, FAST YELLOW 7413 (C.I. Pigment Yellow 74) manufactured by Sanyo Color Works, Ltd., and PrinteX 85 (carbon black) manufactured by Orion Engineered Carbons S.A. respectively, a magenta pigment dispersion 10, yellow pigment dispersion 10 and black pigment dispersion 10 were obtained in the same manner as the above preparation example for the cyan pigment dispersion 10.

(3) Binder Resin

<Production Example for Joncryl 690 Varnish>

The materials listed below were mixed together under constant stirring at room temperature for 30 minutes, and the mixture was then heated to 60° C. and stirred for a further three hours. Subsequently, the mixture was cooled to room temperature to obtain a Joncryl 690 varnish.

(Materials)

Joncryl 690 (an acrylic resin manufactured by BASF Corporation, weight average molecular weight: 16,500, acid value: 240 mgKOH/g) 20 parts Ion-exchanged water 80 parts (4) Inkjet Ink Sets <Production Example for CMYK Inkjet Ink Set 1>

The materials listed below were added sequentially to a mixing container under constant stirring with a stirrer, and were mixed thoroughly until a uniform mixture was obtained. Subsequently, a filtration was performed using a membrane filter having a pore size of 1 µm to remove coarse particles that can cause inkjet head blockages, thus obtaining an ink.

More specifically, by conducting the above step with each of the previously prepared cyan pigment dispersion 1, magenta pigment dispersion 1, yellow pigment dispersion 1 and black pigment dispersion 1, a cyan ink, magenta ink, yellow ink and black ink were obtained. Using these four color inks, a CMYK inkjet ink set 1 was produced.

| | |
|---|---|
| Pigment dispersion 1 | 30 parts (each of the previously prepared pigment dispersions 1 of cyan, magenta, yellow and black) |
| Joncryl 8211 (an acrylic resin emulsion manufactured by BASF Corporation, solid fraction: 44%) | 13 parts |
| Diethylene glycol monoisopropyl ether (DEMiPE) | 17 parts |
| Diethylene glycol monobutyl ether (DEMBE) | 10 parts |
| Triethanolamine (TEA) | 0.5 parts |
| Surfynol 465 (an acetylene-based surfactant manufactured by Air Products and Chemicals, Inc., Griffin method HLB value = 13) | 1 part |

| | |
|---|---|
| PROXEL GXL | 0.05 parts |
| Ion-exchanged water | 28.45 parts |

The viscosity of each of the obtained inks at 25° C. was measured using an ε-type viscometer (TVE25L viscometer, manufactured by Toki Sangyo Co., Ltd.). The average value of the viscosities of the cyan ink, magenta ink, yellow ink and black ink that constitute the above CMYK inkjet ink set 1 is shown in Table 3.

Further, the weighted average boiling point for the water-soluble organic solvent shown in Table 3 represents the value for the weighted average boiling point at one atmosphere. This weighted average boiling point is a value obtained by calculating, for each water-soluble organic solvent, the product of the boiling point at one atmosphere and the mass ratio of that organic solvent relative to the total mass of all of the water-soluble organic solvents, and then adding together the calculated products for the various water-soluble organic solvents.

<Production Examples for CMYK Inkjet Ink Sets 2 to 45>

With the exception of using the materials shown below in Table 3, the same method as that described for the inkjet ink set 1 was used to obtain CMYK inkjet ink sets 2 to 45 (each composed of the four colors of C, M, Y, K). For each of these inkjet ink sets, the viscosity was measured and the weighted average boiling point of the water-soluble organic solvents at one atmosphere was determined in the same manner as described for the inkjet ink set 1. These results are shown in Table 3.

TABLE 3

| Blend amount (%) | | | 1 | 2 | 3 | 4 | 5 | 6 | 7 | 8 | 9 | 10 | 11 | 12 |
|---|---|---|---|---|---|---|---|---|---|---|---|---|---|---|
| | Pigment dispersion | Pigment dispersion 1 | 30 | | | | | | | | | | | |
| | | Pigment dispersion 2 | | 30 | | | | | | | | | | |
| | | Pigment dispersion 3 | | | 30 | | | | | | | | | |
| | | Pigment dispersion 4 | | | | 30 | | | | | | | | |
| | | Pigment dispersion 5 | | | | | 30 | | | | | | | |
| | | Pigment dispersion 6 | | | | | | 30 | | | | | | |
| | | Pigment dispersion 7 | | | | | | | 30 | | | | | |
| | | Pigment dispersion 8 | | | | | | | | 30 | | | | |
| | | Pigment dispersion 9 | | | | | | | | | 30 | | | |
| | | Pigment dispersion 10 | | | | | | | | | | 30 | | |
| | Binder resin | CABOJET | | | | | | | | | | | 60 | |
| | | Joncryl 8211 (solid fraction: 44%) | 13 | 13 | 13 | 13 | 13 | 13 | 13 | 13 | 13 | 13 | 13 | 13 |
| | | Joncryl 690 varnish (solid fraction: 20%) | | | | | | | | | | | | 30 |
| Water-soluble organic solvent | Organic solvent (A) | DEMEE (boiling point: 196° C.) | 17 | 17 | 17 | 17 | 17 | 17 | 17 | 17 | 17 | 17 | 16 | 22 |
| | | DEMiPE (boiling point: 207° C.) | 10 | 10 | 10 | 10 | 10 | 10 | 10 | 10 | 10 | 10 | 9 | 12.5 |
| | | DEMBE (boiling point: 230° C.) | | | | | | | | | | | | |
| | | DEMiBE (boiling point: 241° C.) | | | | | | | | | | | | |
| | | TEMBE (boiling point: 278° C.) | | | | | | | | | | | | |
| | Other organic solvent | Glycerol (boiling point: 290° C.) | | | | | | | | | | | | |
| pH adjuster | | TEA | 0.5 | 0.5 | 0.5 | 0.5 | 0.5 | 0.5 | 0.5 | 0.5 | 0.5 | 0.5 | 0.5 | 0.5 |
| | | NaOH | | | | | | | | | | | | |

TABLE 3-continued

| | | 13 | 14 | 15 | 16 | 17 | 18 | 19 | 20 | 21 | 22 | 23 |
|---|---|---|---|---|---|---|---|---|---|---|---|---|
| Surfactant acetylene | Surfynol 465 | 1 | 1 | 1 | 1 | 1 | 1 | 1 | 1 | 1 | 1 | 1 |
| Preservative | PROXEL GXL | 0.05 | 0.05 | 0.05 | 0.05 | 0.05 | 0.05 | 0.05 | 0.05 | 0.05 | 0.05 | 0.05 |
| Water | | 28.45 | 28.45 | 28.45 | 28.45 | 28.45 | 28.45 | 28.45 | 28.45 | 28.45 | 0.45 | 20.95 |
| Total | | 100 | 100 | 100 | 100 | 100 | 100 | 100 | 100 | 100 | 100 | 100 |
| Inkjet ink viscosity | | 8.0 | 7.7 | 7.5 | 7.4 | 7.9 | 8.3 | 7.1 | 8.0 | 7.8 | 7.3 | 7.4 | 7.7 |
| Total amount of water-soluble organic solvent (%) | | 27.0 | 27.0 | 27.0 | 27.0 | 27.0 | 27.0 | 27.0 | 27.0 | 27.0 | 27.0 | 25.0 | 34.5 |
| Blend amount of solvent (B) when blend amount of solvent (A) is deemed 1 | | 0.0 | 0.0 | 0.0 | 0.0 | 0.0 | 0.0 | 0.0 | 0.0 | 0.0 | 0.0 | 0.0 |
| Amount of water-soluble organic solvent having boiling point of 245° C. or higher (%) | | 0.0 | 0.0 | 0.0 | 0.0 | 0.0 | 0.0 | 0.0 | 0.0 | 0.0 | 0.0 | 0.0 |
| Weighted average boiling point of water-soluble organic solvents (° C.) | | 215.5 | 215.5 | 215.5 | 215.5 | 215.5 | 215.5 | 215.5 | 215.5 | 215.5 | 215.3 | 215.3 |

| | | CMYK inkjet ink set | | | | | | | | | | |
|---|---|---|---|---|---|---|---|---|---|---|---|---|
| | | 13 | 14 | 15 | 16 | 17 | 18 | 19 | 20 | 21 | 22 | 23 |
| Blend amount (%) | Pigment dispersion | | | | | | | | | | | |
| | Pigment dispersion 1 | 30 | | | | 30 | | | | | | |
| | Pigment dispersion 2 | | 30 | | | | | | | | | |
| | Pigment dispersion 3 | | | 30 | | | | | | | | |
| | Pigment dispersion 4 | | | | 30 | | | | | | | |
| | Pigment dispersion 5 | | | | | | | 30 | | | | |
| | Pigment dispersion 6 | | | | | | | | 30 | | | |
| | Pigment dispersion 7 | | | | | | | | | 30 | | |
| | Pigment dispersion 8 | | | | | | | | | | 30 | |
| | Pigment dispersion 9 | | | | | | | | | | | 30 |
| | Pigment dispersion 10 | | | | | | | | | | | |
| | CABOJET | | | | | | | | | | | |
| Binder resin | Joncryl 8211 (solid fraction: 44%) | 13 | 13 | 13 | | 13 | 13 | 13 | 13 | 13 | 13 | |
| | Joncryl 690 varnish (solid fraction: 20%) | | | | | | | | | | | 28.6 |
| Water-soluble Organic solvent | DEMEE (boiling point: | | | | | | 17 | | | | 3.5 | 3.5 |

TABLE 3-continued

|  |  |  | 24 | 25 | 26 | 27 | 28 | 29 | 30 | 31 | 32 | 33 | 34 | 35 |
|---|---|---|---|---|---|---|---|---|---|---|---|---|---|---|
| organic solvent | (A) | 196° C.) |  | 15 | 12.5 | 2.5 | 1.3 | 17 |  |  |  |  | 5.5 | 5.5 |
|  |  | DEMiPE (boiling point: 207° C.) |  |  |  |  |  |  |  |  |  |  |  |  |
|  |  | DEMBE (boiling point: 230° C.) |  | 9 | 7.5 | 1.5 | 0.7 |  |  | 17 |  |  |  |  |
|  |  | DEMiBE (boiling point: 241° C.) |  |  |  |  |  |  |  |  | 13.5 |  |  |  |
|  |  | TEMBE (boiling point: 278° C.) |  |  |  |  |  |  |  |  |  |  |  |  |
|  | Other organic solvent | Glycerol (boiling point: 290° C.) |  |  |  |  |  |  | 10 |  |  | 10 | 8 | 8 |
| pH adjuster |  | TEA |  | 0.5 | 0.5 | 0.5 | 0.5 | 0.5 | 0.1 | 0.5 | 0.5 | 0.5 | 0.1 | 0.1 |
|  |  | NaOH |  | 1 | 1 | 1 | 1 | 1 | 1 | 1 | 1 | 1 | 1 | 1 |
| Surfactant acetylene |  | Surfynol 465 |  | 0.05 | 0.05 | 0.05 | 0.05 | 0.05 | 0.05 | 0.05 | 0.05 | 0.05 | 0.05 | 0.05 |
| Preservative |  | PROXEL GXL |  |  |  |  |  |  |  |  |  |  |  |  |
| Water |  |  |  | 31.45 | 35.45 | 51.45 | 53.45 | 38.45 | 28.85 | 38.45 | 38.45 | 38.45 | 38.85 | 23.25 |
| Total |  |  |  | 100 | 100 | 100 | 100 | 100 | 100 | 100 | 100 | 100 | 100 | 100 |
| Inkjet ink viscosity |  |  |  | 7.7 | 7.7 | 7.0 | 7.0 | 7.8 | 12.0 | 7.7 | 8.0 | 8.0 | 7.7 | 7.7 |
| Total amount of water-soluble organic solvent (%) |  |  |  | 34.5 | 24.0 | 20.0 | 4.0 | 2.0 | 17.0 | 10.0 | 17.0 | 17.0 | 13.5 | 13.5 |
| Blend amount of solvent (B) when blend amount of solvent (A) is deemed 1 |  |  |  | 0.0 | 0.0 | 0.0 | 0.0 | 0.0 | 0.0 | 0.0 | 0.0 | 0.0 | 0.0 | 0.0 |
| Amount of water-soluble organic solvent having boiling point of 245° C. or higher (%) |  |  |  | 0.0 | 0.0 | 0.0 | 0.0 | 0.0 | 10.0 | 0.0 | 0.0 | 10.0 | 8.0 | 8.0 |
| Weighted average boiling point of water-soluble organic solvents (° C.) |  |  |  | 215.6 | 215.6 | 215.6 | 215.1 | 207.0 | 230.8 | 230.0 | 234.0 | 248.8 | 238.1 | 238.1 |

|  |  |  | CMYK inkjet ink set |
|---|---|---|---|

| Blend amount (%) | Pigment dispersion | Pigment dispersion 1 | 30 | 30 | 30 | 30 | 30 | 30 | 30 | 30 | 30 | 30 |  |  |
|  |  | Pigment dispersion 5 |  |  |  |  |  |  |  |  |  |  | 30 |  |
|  |  | Pigment dispersion 9 |  |  |  |  |  |  |  |  |  |  |  | 30 |
|  | Binder resin | Joncryl 8211 (solid fraction: 44%) | 13 | 13 | 13 | 13 | 13 | 13 | 13 | 13 | 13 | 13 | 13 | 13 |
|  |  | Joncryl 690 |  |  |  |  |  |  |  |  |  |  |  |  |

TABLE 3-continued

| | | | | | | | | | | | | | |
|---|---|---|---|---|---|---|---|---|---|---|---|---|---|
| Water-soluble organic solvent | Organic solvent (A) | varnish (solid fraction: 20%) | | | | | | | | | | | | |
| | | DEMEE (boiling point: 196° C.) | 17 | 7 | 4.5 | 3.2 | 17 | 17 | 17 | 17 | 17 | 10 | 15 | 5 |
| | | DEMPE (boiling point: 207° C.) | | | | | | | | | | | | |
| | | DEMBE (boiling point: 230° C.) | | | | | | | | | | | | |
| | Diol-based solvent (B) | 1,2-PD (boiling point: 188° C.) | 10 | 20 | 20 | 20 | | | 20 | | | 30 | 40 | |
| | | 1,3-PD (boiling point: 214° C.) | | | 2.5 | 3.8 | 10 | | | | | | | |
| | | 1,3-BuD (boiling point: 224° C.) | | | | | | 10 | | | | | | |
| | | 1,2-HexD (boiling point: 207° C.) | | | | | | | | 10 | | | | |
| | | 1,5-PenD (boiling point: 239° C.) | | | | | | | | | | | | |
| | Other organic solvent | DEG (boiling point: 244° C.) | | | | | | | 2.5 | | | | | |
| | | TEMME (boiling point: 249° C.) | | | | | | | | | 10 | | | |
| | | EMBE (boiling point: 171° C.) | | | | | | | | | | | | |
| | | Glycerol (boiling point: 290° C.) | | | | | | | | | | | | 10 |
| pH adjuster | | TEA | 0.1 | 0.1 | 0.1 | 0.1 | 0.1 | 0.1 | 0.1 | 0.1 | 0.1 | 0.1 | 0.1 | 0.1 |
| | | NaOH | | | | | | | | | | | | |
| Surfactant | acetylene | Surfynol 465 | 1 | 1 | 1 | 1 | 1 | 1 | 1 | 1 | 1 | 1 | 1 | 1 |
| | | Surfynol 104E | | | | | | | | | | | | |
| | siloxane | BYK348 | | | | | | | | | | | | |
| | fluorine | Zonyl FS-300 | | | | | | | | | | | | |
| Preservative | | PROXEL GXL | 0.05 | 0.05 | 0.05 | 0.05 | 0.05 | 0.05 | 0.05 | 0.05 | 0.05 | 0.05 | 0.05 | 0.05 |
| Water | | | 28.85 | 28.85 | 28.85 | 28.85 | 28.85 | 28.85 | 16.35 | 28.85 | 28.85 | 15.85 | 0.85 | 40.85 |
| Total | | | 100 | 100 | 100 | 100 | 100 | 100 | 100 | 100 | 100 | 100 | 100 | 100 |
| Inkjet ink viscosity | | | 8.0 | 8.0 | 7.9 | 8.0 | 7.8 | 8.3 | 9.5 | 8.8 | 8.6 | 7.8 | 7.9 | 10.1 |
| Total amount of water-soluble organic solvent (%) | | | 27.0 | 27.0 | 27.0 | 27.0 | 27.0 | 27.0 | 39.5 | 27.0 | 27.0 | 40.0 | 55.0 | 15.0 |

TABLE 3-continued

| | 34 | 35 | 36 | 37 | 38 | 39 | 40 | 41 | 42 | 43 | 44 | 45 |
|---|---|---|---|---|---|---|---|---|---|---|---|---|
| Blend amount of solvent (B) when blend amount of solvent (A) is deemed 1 | 0.6 | 2.9 | 5.0 | 7.4 | 0.6 | 0.6 | 1.3 | 0.6 | 0.6 | 3.0 | 2.7 | 2.0 |
| Amount of water-soluble organic solvent having boiling point of 245° C. or higher (%) | 0.0 | 0.0 | 0.0 | 0.0 | 0.0 | 0.0 | 0.0 | 0.0 | 0.0 | 0.0 | 0.0 | 0.0 |
| Weighted average boiling point of water-soluble organic solvents (° C.) | 200.0 | 192.9 | 193.6 | 193.9 | 209.6 | 207.0 | 199.7 | 213.3 | 218.9 | 192.8 | 193.2 | 231.7 |

CMYK inkjet ink set

| | | | 36 | 37 | 38 | 39 | 40 | 41 | 42 | 43 | 44 | 45 |
|---|---|---|---|---|---|---|---|---|---|---|---|---|
| Blend amount (%) | Pigment dispersion | Pigment dispersion 1 | 30 | 30 | 30 | | 30 | 30 | 30 | 30 | 30 | 30 |
| | | Pigment dispersion 5 | | | | 30 | | | | | | |
| | | Pigment dispersion 9 | | | | | | | | | | |
| | Binder resin | Joncryl 8211 (solid fraction: 44%) | 13 | 13 | 13 | 13 | 13 | 13 | 13 | 13 | 13 | 13 |
| | | Joncryl 690 varnish (solid fraction: 20%) | | | | | | | | | | |
| | Water-soluble organic solvent | Organic solvent (A) | | | | | | | | | | |
| | | DEMEE (boiling point: 196° C.) | 6 | 17 | | | | | | | | |
| | | DEMiPE (boiling point: 207° C.) | 2 | | | | 17 | 17 | | | | |
| | | DEMBE (boiling point: 230° C.) | | | 5 | 17 | 10 | 10 | | | | |
| | | Diol-based solvent (B) | | | | | | | | | | |
| | | 1,2-PD (boiling point: 188° C.) | | | | | | | 10 | | | |
| | | 1,3-PD (boiling point: 214° C.) | | | | | | 17 | | | | 17 |
| | | 1,3-BuD (boiling point: 207° C.) | | | | | | | | | | |
| | | DEMBE (boiling point: 207° C.) | | | | | | | | | | |
| | | DEG (boiling point: 244° C.) | | | 10 | | | | | | | |
| | | 1,2-HexD (boiling point: 224° C.) | | | | | | | | | | |
| | | 1,5-PenD | | | | | | | | | | |

TABLE 3-continued

| | | | | | | | | | | | |
|---|---|---|---|---|---|---|---|---|---|---|---|
| Other organic solvent | TEMME (boiling point: 239° C.) | | | | | | | | 17 | 17 | |
| | EMBE (boiling point: 249° C.) | | | | | | | | | | |
| | Glycerol (boiling point: 171° C.) | 12 | | 20 | | | | 7 | | | |
| | (boiling point: 290° C.) | | | | 10 | | | | | | |
| pH adjuster | TEA | 1 | 1 | 1 | 1 | 0.5 | 0.5 | 0.5 | 0.5 | 0.5 | 0.5 |
| | NaOH | | | | | | | 1 | 1 | 1 | |
| Surfactant | acetylene Surfynol 465 | 1 | 1 | 1 | 0.5 | | | | | | |
| | Surfynol 104E | | | | | 1 | | | | | |
| | siloxane BYK348 | | | | | | 2.5 | | | | |
| | fluorine Zonyl FS-300 | | | | | | | | | | |
| Preservative | PROXEL GXL | 0.05 | 0.05 | 0.05 | 0.05 | 0.05 | 0.05 | 0.05 | 0.05 | 0.05 | 0.05 |
| Water | | 34.95 | 37.95 | 19.95 | 28.45 | 28.45 | 26.95 | 38.45 | 38.45 | 38.45 | 39.45 |
| Total | | 100 | 100 | 100 | 100 | 100 | 100 | 100 | 100 | 100 | 100 |
| Inkjet ink viscosity | | 7.8 | 7.3 | 7.5 | 7.8 | 7.9 | 7.9 | 7.5 | 8.0 | 8.1 | 7.5 |
| Total amount of water-soluble organic solvent (%) | | 20.0 | 17.0 | 35.0 | 27.0 | 27.0 | 27.0 | 17.0 | 17.0 | 17.0 | 17.0 |
| Blend amount of solvent (B) when blend amount of solvent (A) is deemed 1 | | 0.0 | 0.0 | 2.0 | 0.0 | 0.0 | 0.0 | — | — | — | 0.0 |
| Amount of water-soluble organic solvent having boiling point of 245° C. or higher (%) | | 12.0 | 0.0 | 20.0 | 10.0 | 0.0 | 0.0 | 7.0 | 0.0 | 17.0 | 0.0 |
| Weighted average boiling point of water-soluble organic solvents (° C.) | | 259.1 | 207.0 | 268.3 | 237.0 | 215.5 | 215.5 | 230.0 | 171.0 | 249.0 | 207.0 |

Of the materials shown in Table 3, details regarding the materials and abbreviations not used in Table 1 or the above description are as follows.

<1> Pigment Dispersions

CABOJET:

Cyan: Cabojet 250C (a self-dispersing copper phthalocyanine pigment dispersion, manufactured by Cabot Corporation, pigment concentration: 10%)

Magenta: Cabojet 265M (a self-dispersing magenta pigment dispersion, manufactured by Cabot Corporation, pigment concentration: 10%)

Yellow: Cabojet 270 (a self-dispersing yellow pigment dispersion, manufactured by Cabot Corporation, pigment concentration: 10%)

Black: Cabojet 200 (a self-dispersing carbon black aqueous solution, manufactured by Cabot Corporation, pigment concentration: 20%) was diluted with an equal volume of water to adjust the pigment concentration to 10%

<2> Specified Glycol Ether-Based Organic Solvents (A)

DEMEE: diethylene glycol monoethyl ether (boiling point: 196° C.)

DEMiPE: diethylene glycol monoisopropyl ether (boiling point: 207° C.)

DEMBE: diethylene glycol monobutyl ether (boiling point: 230° C.)

DEMiBE: diethylene glycol monoisobutyl ether (boiling point: 241° C.)

TEMBE: triethylene glycol monobutyl ether (boiling point: 278° C.)

<3> Diol-Based Solvent (B) of Specified Surface Tension 1,3-PD: 1,3-propanediol (boiling point: 214° C., surface tension: 47.1 mN/m)

1,3-BuD: 1,3-butanediol (boiling point: 207° C., surface tension: 37.1 mN/m)

1,5-PenD: 1,5-pentanediol (boiling point: 239° C., surface tension: 42.2 mN/m)

<4> Other Organic Solvents

TEMME: triethylene glycol monomethyl ether (boiling point: 249° C.)

EMBE: ethylene glycol monobutyl ether (boiling point: 171° C.)

<Surfactant>

Zonyl FS-300: a fluorine-based surfactant manufactured by E. I. du Pont de Nemours and Company (solid fraction concentration: 40%, Griffin method HLB value=14)

III. Evaluations of Treatment Liquids and Inkjet Inks (1) Production Examples for Recording Media with Applied Treatment Liquid <Production Example for Recording Medium 1a with Applied Treatment Liquid>

Using a print tester Flexiproof 100 (manufactured by Matsuo Sangyo Co., Ltd.), the treatment liquid 1 prepared in the manner described above was coated uniformly onto UPM Finesse gloss paper (manufactured by UPM Corporation, grammage: 115 g/m$^2$, referred to as "recording medium A" in the subsequent description and Tables 4 to 6). The coating was performed using a ceramic roller having 140 ridges/inch at a speed of 80 m/min, so as to achieve a coating film thickness of the treatment liquid 1 of 3.0±0.3 μm. Following application of the treatment liquid 1 in the manner described above, the UPM Finesse gloss paper was dried for three minutes in a 50° C. air oven, thus completing production of a recording medium 1a with the applied treatment liquid.

<Production Examples for Recording Media 2a to 35a and 48a to 53a with Applied Treatment Liquids>

Using the same method as the recording medium 1a with the applied treatment liquid, recording media 2a to 35a and 48a to 53a each with an applied treatment liquid were produced using the treatment liquids shown in Table 4.

<Production Example for Recording Medium 36a with Applied Treatment Liquid>

With the exceptions of using the treatment liquid 3 prepared above, using the print tester Flexiproof 100 with a ceramic roller having 1,000 ridges/inch, and performing the coating so as to achieve a coating film thickness of the treatment liquid 3 of 0.4±0.1 μm, a recording medium 36a with an applied treatment liquid was produced in the same manner as the recording medium 1a with an applied treatment liquid.

<Production Example for Recording Medium 37a with Applied Treatment Liquid>

Following production of the recording medium 3a with an applied treatment liquid, a print tester Flexiproof 100 with a ceramic roller having 140 ridges/inch was used to apply a second coating of the treatment liquid 3 to the surface already coated with the treatment liquid 3. The recording medium was then dried for three minutes in a 50° C. air oven. This process was repeated a further two times to produce a recording medium 37a with an applied treatment liquid in which the total wet coating film thickness of the treatment liquid 3 was 12.0±1.2 μm.

<Production Examples for Recording Media 38a to 42a and 54a with Applied Treatment Liquids>

With the exceptions of using the treatment liquids 2, 3, 5, 8, 19 and 36, and using Npi high-quality paper 45 (manufactured by Nippon Paper Industries Co., Ltd., grammage: 52.3 g/m$^2$, referred to as "recording medium B" in the subsequent description and Tables 4 to 6) as the recording medium, recording media 38a to 42a and 54a with applied treatment liquids were produced in the same manner as the recording medium 1a with an applied treatment liquid.

<Production Examples for Recording Medium 43a to 47a with Applied Treatment Liquids>

With the exceptions of using the treatment liquids 2, 3, 5, 8 and 19, and using Craft Reproliner (manufactured by Oji F-Tex C., Ltd., ream weight: 146 kg, referred to as "recording medium C" in the subsequent description and Tables 4 to 6) as the recording medium, recording media 43a to 47a with applied treatment liquids were produced in the same manner as the recording medium 1a with an applied treatment liquid.

TABLE 4

| Recording medium with applied treatment liquid | Treatment liquid No. | Recording medium | Coating film thickness (μm) | Amount of calcium ions (mmol/m$^2$) |
|---|---|---|---|---|
| 1a | 1 | A | 3.0 | 1.2 |
| 2a | 2 | A | 3.0 | 1.4 |
| 3a | 3 | A | 3.0 | 2.5 |
| 4a | 4 | A | 3.0 | 3.2 |
| 5a | 5 | A | 3.0 | 3.6 |
| 6a | 6 | A | 3.0 | 3.8 |
| 7a | 7 | A | 3.0 | 2.5 |
| 8a | 8 | A | 3.0 | 2.5 |
| 9a | 9 | A | 3.0 | 2.5 |
| 10a | 10 | A | 3.0 | 2.5 |
| 11a | 11 | A | 3.0 | 2.5 |
| 12a | 12 | A | 3.0 | 2.5 |
| 13a | 13 | A | 3.0 | 2.5 |

TABLE 4-continued

| Recording medium with applied treatment liquid | Treatment liquid No. | Recording medium | Coating film thickness (μm) | Amount of calcium ions (mmol/m²) |
|---|---|---|---|---|
| 14a | 14 | A | 3.0 | 2.5 |
| 15a | 15 | A | 3.0 | 2.5 |
| 16a | 16 | A | 3.0 | 2.5 |
| 17a | 17 | A | 3.0 | 2.5 |
| 18a | 18 | A | 3.0 | 2.5 |
| 19a | 19 | A | 3.0 | 2.5 |
| 20a | 20 | A | 3.0 | 2.5 |
| 21a | 21 | A | 3.0 | 2.5 |
| 22a | 22 | A | 3.0 | 2.5 |
| 23a | 23 | A | 3.0 | 2.5 |
| 24a | 24 | A | 3.0 | 2.5 |
| 25a | 25 | A | 3.0 | 2.5 |
| 26a | 26 | A | 3.0 | 2.5 |
| 27a | 27 | A | 3.0 | 2.5 |
| 28a | 28 | A | 3.0 | 2.5 |
| 29a | 29 | A | 3.0 | 2.5 |
| 30a | 30 | A | 3.0 | 2.5 |
| 31a | 31 | A | 3.0 | 2.5 |
| 32a | 32 | A | 3.0 | 2.5 |
| 33a | 33 | A | 3.0 | 2.5 |
| 34a | 34 | A | 3.0 | 2.5 |
| 35a | 35 | A | 3.0 | 2.5 |
| 36a | 3 | A | 0.4 | 0.3 |
| 37a | 3 | A | 12.0 | 10.2 |
| 38a | 2 | B | 3.0 | 1.4 |
| 39a | 3 | B | 3.0 | 2.5 |
| 40a | 5 | B | 3.0 | 3.6 |
| 41a | 8 | B | 3.0 | 2.5 |
| 42a | 19 | B | 3.0 | 2.5 |
| 43a | 2 | C | 3.0 | 1.4 |
| 44a | 3 | C | 3.0 | 2.5 |
| 45a | 5 | C | 3.0 | 3.6 |
| 46a | 8 | C | 3.0 | 2.5 |
| 47a | 19 | C | 3.0 | 2.5 |
| 48a | 36 | A | 3.0 | 2.1 |
| 49a | 37 | A | 3.0 | 0.0 |
| 50a | 38 | A | 3.0 | 1.0 |
| 51a | 39 | A | 3.0 | 4.0 |
| 52a | 40 | A | 3.0 | 2.5 |
| 53a | 41 | A | 3.0 | 2.5 |
| 54a | 36 | B | 3.0 | 2.1 |

(2) Evaluation of Treatment Liquid Coating Irregularities
<Evaluation of Treatment liquid Coating Irregularities (Initial)>

In order to enhance the visibility, 0.1 g of Kayafect Red P Liquid (manufactured by Nippon Kayaku Co., Ltd.) was added to 9.9 g samples of each of the treatment liquids 1 to 35 produced above. These samples were then each mixed thoroughly to dissolve the dye, thus obtaining colored treatment liquids 1 to 35.

Using a Flexiproof 100 (manufactured by Matsuo Sangyo Co., Ltd.), each of these colored treatment liquids was coated uniformly onto the recording medium shown below in Table 5. The coating of the colored treatment liquid was performed using a ceramic roller having 140 ridges/inch at a speed of 80 m/min, so as to achieve a coating film thickness of the treatment liquid 1 of 3.0±0.3 μm. Following application of the colored treatment liquid, the recording medium was dried for three minutes in a 50° C. air oven, thus completing production of a recording media 1b to 45b each with an applied colored treatment liquid.

The level of treatment liquid coating irregularities (the initial coating applicability) was evaluated by continuously producing 10 copies of each recording medium with an applied colored treatment liquid using the method described above, and visually inspecting each recording medium for color irregularities. The evaluation criteria were as follows, with evaluations of A and B deemed to represent a good level of coating irregularities for the treatment liquid.
(Evaluation Criteria)

A: absolutely no coating irregularities observed in any of the 10 copies.

B: coating irregularities observed in one or two of the 10 copies.

C: coating irregularities observed in at least three of the 10 copies.

<Evaluation of Treatment Liquid Coating Irregularities (after Aging)>

Ten kg of each of the above treatment liquids 1 to 35 was placed in an 18-liter drum, and with the drum unsealed in an open state, the drum was left to stand for one week at room temperature. Subsequently, the solid fraction concentration of each treatment liquid was measured, and if the measured value was greater than that prior to the standing period, then water was added to adjust the solid fraction concentration to the same as that prior to standing, thereby completing preparation of aged treatment liquids 1 to 35.

Using the above aged treatment liquids 1 to 35, aged colored treatment liquids 1 to 35 were prepared using the same method as that described above in the evaluation method for treatment liquid coating irregularities. Recording media 1c to 45 with these applied aged colored treatment liquids were then produced, and the level of treatment liquid coating irregularities after aging (the coating applicability after aging) was evaluated. The same evaluation criteria as those described above were used.

The evaluation results for the above coating irregularities are shown in Table 5.

TABLE 5

| Recording medium used | | | | Treatment liquid coating irregularities | |
|---|---|---|---|---|---|
| Recording medium with applied colored treatment liquid | Recording medium with applied aged colored treatment liquid | Treatment liquid No. | Recording medium | Initial | After aging |
| 1b | 1c | 1 | A | A | A |
| 2b | 2c | 2 | A | A | A |
| 3b | 3c | 3 | A | A | A |
| 4b | 4c | 4 | A | A | A |
| 5b | 5c | 5 | A | A | A |
| 6b | 6c | 6 | A | A | A |
| 7b | 7c | 7 | A | A | A |
| 8b | 8c | 8 | A | A | A |
| 9b | 9c | 9 | A | A | A |
| 10b | 10c | 10 | A | A | A |
| 11b | 11c | 11 | A | A | A |
| 12b | 12c | 12 | A | A | A |
| 13b | 13c | 13 | A | A | B |
| 14b | 14c | 14 | A | A | B |
| 15b | 15c | 15 | A | A | B |
| 16b | 16c | 16 | A | A | B |
| 17b | 17c | 17 | A | A | A |
| 18b | 18c | 18 | A | A | A |
| 19b | 19c | 19 | A | A | A |
| 20b | 20c | 20 | A | A | B |
| 21b | 21c | 21 | A | A | A |
| 22b | 22c | 22 | A | A | A |
| 23b | 23c | 23 | A | A | A |
| 24b | 24c | 24 | A | A | A |
| 25b | 25c | 25 | A | A | A |
| 26b | 26c | 26 | A | A | A |
| 27b | 27c | 27 | A | A | A |
| 28b | 28c | 28 | A | A | A |
| 29b | 29c | 29 | A | A | A |
| 30b | 30c | 30 | A | A | B |

TABLE 5-continued

Recording medium used

| Recording medium with applied colored treatment liquid | Recording medium with applied aged colored treatment liquid | Treatment liquid No. | Recording medium | Treatment liquid coating irregularities Initial | After aging |
|---|---|---|---|---|---|
| 31b | 31c | 31 | A | A | A |
| 32b | 32c | 32 | A | B | B |
| 33b | 33c | 33 | A | A | A |
| 34b | 34c | 34 | A | A | A |
| 35b | 35c | 35 | A | B | B |
| 36b | 36c | 2 | B | A | A |
| 37b | 37c | 3 | B | A | A |
| 38b | 38c | 5 | B | A | A |
| 39b | 39c | 8 | B | A | A |
| 40b | 40c | 19 | B | A | A |
| 41b | 41c | 2 | C | A | A |
| 42b | 42c | 3 | C | A | A |
| 43b | 43c | 5 | C | A | A |
| 44b | 44c | 8 | C | A | A |
| 45b | 45c | 19 | C | A | B |

IV. Evaluation of Ink Sets

Examples 1 to 87, Comparative Examples 1 to 12

(1) Preparation of Inkjet Ink Set Printing Apparatus

Four inkjet heads KJ4B-1200 (manufactured by Kyocera Corporation) were installed above a conveyor capable of transporting a recording medium, and the K, C, M and Y inkjet inks that constitute an inkjet ink set were used to fill these heads in sequence from the upstream side. The design resolution of these inkjet heads is 1,200 dpi, the maximum drive frequency is 64 kHz, and the recording resolution in the recording medium transport direction during printing at the maximum drive frequency and a printing speed of 80 m/min is 1,200 dpi.

(2) Production of Printed Matter

<Printing of Bicycle Image Printed Matter>

Each of the recording media with an applied treatment liquid produced in the manner described above was secured to the conveyor of the aforementioned inkjet ink set printing apparatus, and the conveyor was driven at a fixed speed listed below. On the other hand, as the recording medium with the applied treatment liquid passed beneath the installed location of the inkjet heads, the inkjet inks were jetted onto the recording medium in KCMY order using a drop volume of 3 pL to print a natural image N5 (bicycle) from the high-precision color digital standard image data (CMYK/SCID) prescribed in JIS X 9201. Within 10 seconds of the completion of printing, the printed matter was fed into a 50° C. air oven and dried for three minutes, thus obtaining a bicycle image printed item. The above conveyor speed was set to one of three speeds: 40 m/min, 60 m/min and 80 m/min, with printing conducted under each of these conditions to obtain printed items.

<Printing of Solid Printed Matter>

Each of the recording media with an applied treatment liquid produced in the manner described above was secured to the conveyor of the aforementioned inkjet ink set printing apparatus, and the conveyor was driven at a fixed speed listed below. On the other hand, as the recording medium with the applied treatment liquid passed beneath the installed location of the inkjet heads, the KCMY inkjet inks were jetted onto the recording medium using a drop volume of 3 pL to print an image in which 3 cm×3 cm solid printing portions with a print ratio of 100% were arranged adjacent to one another in CMYK order. Within 10 seconds of the completion of printing, the printed matter was fed into a 50° C. air oven and dried for a fixed period of time, thus obtaining solid printed matter.

In the coverage evaluation described below, the printed matter that was used was obtained by setting the conveyor speed to one of three speeds: 40 m/min, 60 m/min and 80 m/min, and using a drying time in the 50° C. air oven of three minutes. In the drying properties evaluation, printing was performed at a conveyor speed of 60 m/min, and solid printed items that had been removed from the 50° C. air oven after periods of time that were increased in 30-second intervals were used.

The various combinations of recording media and inkjet inks used in producing the above printed matter were as shown below in Table 6.

(3) Evaluations of Printed Matter

The bicycle image printed matter and the solid printed matter produced above were subjected to each of the evaluations described below. The evaluation results obtained are shown below in Table 6.

TABLE 6

| | Recording medium with applied treatment liquid | | | | | | Evaluation results | | | | |
|---|---|---|---|---|---|---|---|---|---|---|---|
| | Recording medium with applied treatment liquid | Recording medium with applied aged colored treatment liquid | Treatment liquid No. | Recording medium | Coating film thickness (μm) | CMYK inkjet ink set | Initial | | After aging Coverage | Initial Drying properties | Coating film durability |
| | | | | | | | Aggregation | Coverage | | | |
| Example 1 | 1a | 1d | 1 | A | 3.0 | 1 | C | A | A | A | C |
| Example 2 | 2a | 2d | 2 | A | 3.0 | 1 | B | A | A | A | B |
| Example 3 | 3a | 3d | 3 | A | 3.0 | 1 | A | A | A | A | A |
| Example 4 | 4a | 4d | 4 | A | 3.0 | 1 | A | A | A | A | A |
| Example 5 | 5a | 5d | 5 | A | 3.0 | 1 | A | A | B | A | B |
| Example 6 | 6a | 6d | 6 | A | 3.0 | 1 | B | B | C | A | C |
| Example 7 | 7a | 7d | 7 | A | 3.0 | 1 | A | A | A | A | A |
| Example 8 | 8a | 8d | 8 | A | 3.0 | 1 | B | A | A | A | B |
| Example 9 | 9a | 9d | 9 | A | 3.0 | 1 | C | A | A | B | C |

TABLE 6-continued

| | Recording medium with applied treatment liquid | | | | | | Evaluation results | | | | |
| | Recording medium with applied treatment liquid | Recording medium with applied aged colored treatment liquid | Treatment liquid No. | Recording medium | Coating film thickness (μm) | CMYK inkjet ink set | Initial Aggregation | Initial Coverage | After aging Coverage | Initial Drying properties | Coating film durability |
|---|---|---|---|---|---|---|---|---|---|---|---|
| Example 10 | 10a | 10d | 10 | A | 3.0 | 1 | B | A | A | A | B |
| Example 11 | 11a | 11d | 11 | A | 3.0 | 1 | B | A | A | A | B |
| Example 12 | 12a | 12d | 12 | A | 3.0 | 1 | B | A | A | A | B |
| Example 13 | 13a | 13d | 13 | A | 3.0 | 1 | A | B | B | A | B |
| Example 14 | 14a | 14d | 14 | A | 3.0 | 1 | A | A | B | A | A |
| Example 15 | 15a | 15d | 15 | A | 3.0 | 1 | A | A | A | A | A |
| Example 16 | 16a | 16d | 16 | A | 3.0 | 1 | A | A | B | A | B |
| Example 17 | 17a | 17d | 17 | A | 3.0 | 1 | A | A | A | A | A |
| Example 18 | 18a | 18d | 18 | A | 3.0 | 1 | A | A | A | A | A |
| Example 19 | 19a | 19d | 19 | A | 3.0 | 1 | A | A | B | A | A |
| Example 20 | 20a | 20d | 20 | A | 3.0 | 1 | A | A | B | A | A |
| Example 21 | 21a | 21d | 21 | A | 3.0 | 1 | A | A | A | A | A |
| Example 22 | 22a | 22d | 22 | A | 3.0 | 1 | A | A | A | A | A |
| Example 23 | 23a | 23d | 23 | A | 3.0 | 1 | A | A | A | A | B |
| Example 24 | 24a | 24d | 24 | A | 3.0 | 1 | A | A | A | A | A |
| Example 25 | 25a | 25d | 25 | A | 3.0 | 1 | B | A | A | A | B |
| Example 26 | 26a | 26d | 26 | A | 3.0 | 1 | C | A | A | A | C |
| Example 27 | 27a | 27d | 27 | A | 3.0 | 1 | A | A | A | A | A |
| Example 28 | 28a | 28d | 28 | A | 3.0 | 1 | A | A | B | A | B |
| Example 29 | 29a | 29d | 29 | A | 3.0 | 1 | A | A | A | A | A |
| Example 30 | 30a | 30d | 30 | A | 3.0 | 1 | A | A | A | A | B |
| Example 31 | 31a | 31d | 31 | A | 3.0 | 1 | A | A | A | A | B |
| Example 32 | 32a | 32d | 32 | A | 3.0 | 1 | A | A | A | A | B |
| Example 33 | 33a | 33d | 33 | A | 3.0 | 1 | A | A | A | A | A |
| Example 34 | 34a | 34d | 34 | A | 3.0 | 1 | A | A | A | A | A |
| Example 35 | 35a | 35d | 35 | A | 3.0 | 1 | A | A | A | A | A |
| Example 36 | 36a | 36d | 3 | A | 0.4 | 1 | C | A | A | A | B |
| Example 37 | 37a | 37d | 3 | A | 12.0 | 1 | A | B | B | A | B |
| Example 38 | 38a | 38d | 2 | B | 3.0 | 1 | B | A | A | A | B |
| Example 39 | 39a | 39d | 3 | B | 3.0 | 1 | A | A | A | A | B |
| Example 40 | 40a | 40d | 5 | B | 3.0 | 1 | B | B | B | A | B |
| Example 41 | 41a | 41d | 8 | B | 3.0 | 1 | B | A | A | A | C |
| Example 42 | 42a | 42d | 19 | B | 3.0 | 1 | A | A | B | A | B |
| Example 43 | 43a | 43d | 2 | C | 3.0 | 1 | B | A | A | A | B |
| Example 44 | 44a | 44d | 3 | C | 3.0 | 1 | A | A | A | A | B |
| Example 45 | 45a | 45d | 5 | C | 3.0 | 1 | B | B | B | A | B |
| Example 46 | 46a | 46d | 8 | C | 3.0 | 1 | B | A | A | A | C |
| Example 47 | 47a | 47d | 19 | C | 3.0 | 1 | A | A | B | A | B |
| Example 48 | 2a | 2d | 2 | A | 3.0 | 2 | B | A | A | A | B |
| Example 49 | 2a | 2d | 2 | A | 3.0 | 3 | B | A | A | A | B |
| Example 50 | 2a | 2d | 2 | A | 3.0 | 4 | B | B | B | A | B |
| Example 51 | 2a | 2d | 2 | A | 3.0 | 5 | C | B | C | A | B |
| Example 52 | 2a | 2d | 2 | A | 3.0 | 6 | C | B | B | A | B |
| Example 53 | 2a | 2d | 2 | A | 3.0 | 7 | C | A | A | A | B |
| Example 54 | 2a | 2d | 2 | A | 3.0 | 8 | B | B | B | A | B |
| Example 55 | 2a | 2d | 2 | A | 3.0 | 9 | B | A | A | A | B |
| Example 56 | 2a | 2d | 2 | A | 3.0 | 10 | C | B | B | A | B |
| Example 57 | 2a | 2d | 2 | A | 3.0 | 11 | C | A | A | A | C |
| Example 58 | 2a | 2d | 2 | A | 3.0 | 12 | B | B | B | A | C |
| Example 59 | 2a | 2d | 2 | A | 3.0 | 13 | A | A | A | A | A |
| Example 60 | 2a | 2d | 2 | A | 3.0 | 14 | A | A | A | A | A |
| Example 61 | 2a | 2d | 2 | A | 3.0 | 15 | A | A | A | A | A |
| Example 62 | 2a | 2d | 2 | A | 3.0 | 16 | B | B | B | A | C |
| Example 63 | 2a | 2d | 2 | A | 3.0 | 17 | B | A | A | A | B |
| Example 64 | 2a | 2d | 2 | A | 3.0 | 18 | B | B | B | B | C |
| Example 65 | 2a | 2d | 2 | A | 3.0 | 19 | B | A | A | A | B |
| Example 66 | 2a | 2d | 2 | A | 3.0 | 20 | A | A | A | A | B |
| Example 67 | 2a | 2d | 2 | A | 3.0 | 21 | B | A | A | C | B |
| Example 68 | 2a | 2d | 2 | A | 3.0 | 22 | B | A | A | B | B |
| Example 69 | 2a | 2d | 2 | A | 3.0 | 23 | B | A | A | C | B |
| Example 70 | 2a | 2d | 2 | A | 3.0 | 24 | B | B | B | A | B |
| Example 71 | 2a | 2d | 2 | A | 3.0 | 25 | A | A | A | A | B |
| Example 72 | 2a | 2d | 2 | A | 3.0 | 26 | B | A | B | A | B |
| Example 73 | 2a | 2d | 2 | A | 3.0 | 27 | B | B | B | A | B |
| Example 74 | 2a | 2d | 2 | A | 3.0 | 28 | B | B | B | A | B |
| Example 75 | 2a | 2d | 2 | A | 3.0 | 29 | B | B | B | A | B |

TABLE 6-continued

| | Recording medium with applied treatment liquid | | | | | | Evaluation results | | | | |
| --- | --- | --- | --- | --- | --- | --- | --- | --- | --- | --- | --- |
| | Recording medium with applied treatment liquid | Recording medium with applied aged colored treatment liquid | Treatment liquid No. | Recording medium | Coating film thickness (μm) | CMYK inkjet ink set | Initial | | After aging Coverage | Initial Drying properties | Coating film durability |
| | | | | | | | Aggregation | Coverage | | | |
| Example 76 | 2a | 2d | 2 | A | 3.0 | 30 | B | A | A | A | B |
| Example 77 | 2a | 2d | 2 | A | 3.0 | 31 | B | B | B | A | B |
| Example 78 | 2a | 2d | 2 | A | 3.0 | 32 | B | B | B | A | B |
| Example 79 | 2a | 2d | 2 | A | 3.0 | 33 | A | A | A | A | B |
| Example 80 | 2a | 2d | 2 | A | 3.0 | 34 | A | B | B | A | B |
| Example 81 | 2a | 2d | 2 | A | 3.0 | 35 | A | B | B | B | B |
| Example 82 | 2a | 2d | 2 | A | 3.0 | 36 | C | A | A | B | C |
| Example 83 | 2a | 2d | 2 | A | 3.0 | 37 | B | A | A | A | B |
| Example 84 | 2a | 2d | 2 | A | 3.0 | 38 | B | A | A | C | C |
| Example 85 | 2a | 2d | 2 | A | 3.0 | 39 | B | A | A | A | B |
| Example 86 | 2a | 2d | 2 | A | 3.0 | 40 | C | A | A | A | B |
| Example 87 | 2a | 2d | 2 | A | 3.0 | 41 | B | A | A | A | B |
| Comparative Example 1 | — | — | — | A | — | 1 | D | D | — | D | D |
| Comparative Example 2 | 48a | 48d | 36 | A | 3.0 | 1 | B | D | — | D | C |
| Comparative Example 3 | 49a | 49d | 37 | A | 3.0 | 1 | D | B | — | D | B |
| Comparative Example 4 | 50a | 50d | 38 | A | 3.0 | 1 | D | A | — | A | D |
| Comparative Example 5 | 51a | 51d | 39 | A | 3.0 | 1 | B | D | — | A | D |
| Comparative Example 6 | 52a | 52d | 40 | A | 3.0 | 1 | D | A | — | C | C |
| Comparative Example 7 | 53a | 53d | 41 | A | 3.0 | 1 | D | A | — | D | D |
| Comparative Example 8 | 54a | 54d | 36 | B | 3.0 | 1 | C | D | — | C | D |
| Comparative Example 9 | 2a | 2d | 2 | A | 3.0 | 42 | D | C | — | C | D |
| Comparative Example 10 | 2a | 2d | 2 | A | 3.0 | 43 | D | D | — | C | C |
| Comparative Example 11 | 2a | 2d | 2 | A | 3.0 | 44 | D | C | — | D | D |
| Comparative Example 12 | 2a | 2d | 2 | A | 3.0 | 45 | D | C | — | A | C |

In the table, "—" indicates that the evaluation was not performed

<Evaluation of Aggregation Properties (Color Mixing)>

Using a microscope, the dot shape of the 4C (CMYK) printed portion of the above bicycle image printed item was inspected at a magnification of 200× to evaluate the aggregation properties. The evaluation criteria were as follows, with evaluations of A, B and C deemed to indicate good aggregation properties.
(Evaluation Criteria)

A: at all three printing speeds, the dots in the 4C printed portion remained independent and no color mixing was observed.

B: at 40 m/min and 60 m/min, the dots in the 4C printed portion remained independent and no color mixing was observed, but at 80 m/min, color mixing of the dots was observed.

C: at 40 m/min, the dots in the 4C printed portion remained independent and no color mixing was observed, but at 60 m/min and 80 m/min, color mixing of the dots was observed.

D: at all three printing speeds, color mixing of the dots in the 4C printed portion was observed.

<Evaluation of Coverage (Initial)>

Using a microscope, the solid printed matter described above was inspected at a magnification of 200×, and for each color, an evaluation was made as to whether voids were absent and banding was absent. The evaluation criteria were as follows, with evaluations of A, B and C deemed to indicate good coverage. The evaluation result recorded in Table 6 represents the worst evaluation result among the four colors.

(Evaluation Criteria)

A: at all three printing speeds, neither voids nor banding was observed.

B: at 40 m/min and 60 m/min, neither voids nor bands were observed, but at 80 m/min, voids or bands were observed.

C: at 40 m/min, neither voids nor bands were observed, but at 60 m/min and 80 m/min, voids or bands were observed.

D: at all three printing speeds, voids or bands were observed.

<Evaluation of Drying Properties>

The drying properties of the printed matter were evaluated by using a finger to touch solid printed items that had been removed from the 50° C. air oven after periods of time that were increased in 30-second intervals. The evaluation criteria were as follows, with evaluations of A, B and C deemed to indicate good drying properties.

(Evaluation Criteria)

A: even when touched with a finger after 30 seconds in the oven, no ink adhered to the finger.

B: ink adhered to the finger when touched after 30 seconds in the oven, but no ink adhered after one minute in the oven.

C: ink adhered to the finger when touched after one minute in the oven, but no ink adhered after one minute and 30 seconds in the oven.

D: ink adhered to the finger even when touched after one minute and 30 seconds in the oven.

<Evaluation of Coating Film Durability>

The bicycle image printed item described above was installed in a Sutherland Rub Tester (manufactured by Toyo Seiki Seisaku-sho, Ltd.) fitted with a rubbing target paper (NPI-70, manufactured by Nippon Paper Industries Co., Ltd.), 4 pounds of weight was applied, and following a prescribed number of back and forth rubbing repetitions, the coating film durability was evaluated by inspecting the printed item visually to ascertain whether the ink had been rubbed off to expose the substrate. The evaluation criteria were as follows, with evaluations of A, B and C deemed to indicate practically usable levels.

(Evaluation Criteria)

A: even after 20 back and forth rubbing repetitions, the ink remained and the substrate was not visible.

B: after 20 back and forth rubbing repetitions, the ink had rubbed off and the substrate was visible, but after 15 back and forth repetitions, the substrate was not visible.

C: after 15 back and forth rubbing repetitions, the ink had rubbed off and the substrate was visible, but after 10 back and forth repetitions, the substrate was not visible.

D: the ink had rubbed off and the substrate was visible even after 10 back and forth rubbing repetitions.

(4) Evaluation of Ink Sets after Aging

<Production of Aged Ink Sets>

Ten kg of each of the above treatment liquids 1 to 41 and each of the CMYK inkjet ink sets 1 to 45 was placed in an 18-liter drum, and with the drum unsealed in an open state, the drum was left to stand for one week at room temperature. Subsequently, the solid fraction concentration of each treatment liquid and each inkjet ink was measured, and if the measured value was greater than that prior to the standing period (the initial value), then water was added to adjust the solid fraction concentration to the same as that prior to standing, thus completing preparation of aged treatment liquids 1 to 41 and aged CMYK inkjet ink sets 1 to 45.

<Evaluation of Coverage (after Aging)>

Using the above aged treatment liquids 1 to 41, the same method as that described above was used to produce recording media id to 54d with the applied aged treatment liquids. Further, using these recording media Id to 54d with the applied aged treatment liquids and the aged CMYK inkjet ink sets 1 to 45 described above, the same method as that described above for evaluating the coverage was used to evaluated the coverage after aging. The evaluation criteria were the same as described above. The evaluation results are shown in Table 6.

<Evaluation of Jetting Stability of Inkjet Inks>

Using the method described below, each of the aged CMYK inkjet ink sets 1 to 41 produced in the manner described above was used to evaluate the jetting stability simulating the state following a long run.

First, an inkjet jetting apparatus fitted with four inkjet heads KJ4B-1200 (manufactured by Kyocera Corporation) was prepared, and the K, C, M and Y inkjet inks that constitute the aged CMYK inkjet ink set were used to fill these heads in sequence from the upstream side. Then, under conditions including a drop volume of 3 pl and a drive frequency of 64 kHz, ink was jetted continuously from all of the nozzles for two hours. Subsequently, a nozzle check pattern was printed, and the jetting stability was evaluated by counting the number of missing nozzles. The evaluation criteria were as follows, with evaluations of A, B and C deemed to indicate favorable jetting stability. The valuation results obtained are shown in Table 7.

(Evaluation Criteria)

A: in the nozzle check pattern printed 2 hours after starting printing, there were no missing nozzles.

B: in the nozzle check pattern printed 2 hours after starting printing, there were 1 or 2 missing nozzles.

C: in the nozzle check pattern printed 2 hours after starting printing, there were 3 or 4 missing nozzles.

D: in the nozzle check pattern printed 2 hours after starting printing, there were 5 or more missing nozzles.

TABLE 7

| CMYK inkjet ink set | Evaluation results Jetting stability |
| --- | --- |
| 1 | A |
| 2 | A |
| 3 | A |
| 4 | A |
| 5 | B |
| 6 | A |
| 7 | A |
| 8 | A |
| 9 | A |
| 10 | A |
| 11 | A |
| 12 | A |
| 13 | A |
| 14 | A |
| 15 | A |
| 16 | A |
| 17 | A |
| 18 | A |
| 19 | A |
| 20 | A |
| 21 | B |
| 22 | B |
| 23 | A |
| 24 | A |
| 25 | A |
| 26 | A |
| 27 | A |
| 28 | A |
| 29 | A |
| 30 | A |
| 31 | A |
| 32 | A |
| 33 | A |
| 34 | A |
| 35 | A |
| 36 | A |
| 37 | A |
| 38 | A |
| 39 | A |
| 40 | A |
| 41 | C |

Based on the above results, it is evident that by using an ink set of the present invention, printed matter of high image quality, with excellent coating film durability and drying properties, and good suppression of image defects such as color mixing and insufficient coverage, can be provided regardless of the recording medium and the printing conditions such as the printing speed and recording resolution.

The invention claimed is:

1. An ink set comprising an inkjet ink, and a treatment liquid used in combination with the inkjet ink, wherein
    the inkjet ink comprises a pigment, a water-soluble organic solvent, a surfactant and water,
    the water-soluble organic solvent comprises a glycol ether-based organic solvent (A) represented by general formula (1) shown below,
    the treatment liquid comprises a coagulant, a pH adjuster, and a binder resin having a number average molecular weight in a range from 3,000 to 90,000,
    the coagulant comprises calcium nitrate in an amount of 6.8 to 20.8% by mass relative to a total mass of the treatment liquid, and
    in the treatment liquid, an amount of compounds having three or more hydroxyl groups is not more than 15% by mass relative to a total mass of the treatment liquid:

$$R1\text{-}(\text{-}O\text{—}CH_2CH_2\text{—})_n\text{-}OH \qquad \text{General formula (1):}$$

wherein R1 represents an alkyl group of 2 to 4 carbon atoms which may have a branched structure, and n represents 2 or 3.

2. The ink set according to claim 1, wherein a pH of the treatment liquid is within a range from 3.5 to 11.

3. The ink set according to claim 1, wherein the treatment liquid also comprises a nonionic surfactant, and the nonionic surfactant includes at least one compound selected from the group consisting of an acetylene-based surfactant and a siloxane-based surfactant.

4. The ink set according to claim 1, wherein the inkjet ink also comprises a pigment dispersing resin.

5. The ink set according to claim 1, wherein the glycol ether-based organic solvent (A) represented by general formula (1) comprises a glycol ether-based organic solvent in which n represents 2.

6. The ink set according to claim 1, wherein the water-soluble organic solvent also comprises a diol-based solvent (B) having a surface tension at 25° C. of 30 to 50 mN/m.

7. The ink set according to claim 6, wherein a mass ratio of a blend amount of the glycol ether-based organic solvent (A) represented by general formula (1) to a blend amount of the diol-based solvent (B) having a surface tension at 25° C. of 30 to 50 mN/m is within a range from 1:0.5 to 1:7.5.

8. The ink set according to claim 1, wherein the binder resin is a water-soluble resin.

9. A method for producing inkjet ink printed matter that uses the ink set according to claim 1, the method comprising:
    a step of applying the treatment liquid to a recording medium formed from a paper substrate or a synthetic paper substrate, and
    a step of applying the inkjet ink by one-pass printing to a portion to which the treatment liquid has been applied.

10. The method for producing inkjet ink printed matter, according to claim 9, wherein in the step of applying the treatment liquid, the treatment liquid is applied to the recording medium so that an amount of calcium ions on a surface of the recording medium is within a range from 0.5 to 5.0 mmol/m².

11. A printed matter obtained by printing the ink set according to claim 1 to a recording medium.

* * * * *